INVENTOR.
THOMAS E. RAYMOND
BY Schmieding and Fultz
ATTORNEYS

INVENTOR.
THOMAS E. RAYMOND
BY Schmieding and Fultz
ATTORNEYS

Oct. 3, 1961  T. E. RAYMOND  3,002,462
FLUID TRANSLATING APPARATUS
Filed Aug. 13, 1957  17 Sheets-Sheet 5

INVENTOR.
THOMAS E. RAYMOND
BY Schmieding and Fultz
ATTORNEYS

Oct. 3, 1961 T. E. RAYMOND 3,002,462
FLUID TRANSLATING APPARATUS
Filed Aug. 13, 1957 17 Sheets-Sheet 7

INVENTOR.
THOMAS E. RAYMOND
BY Schmieding and Fultz
ATTORNEYS

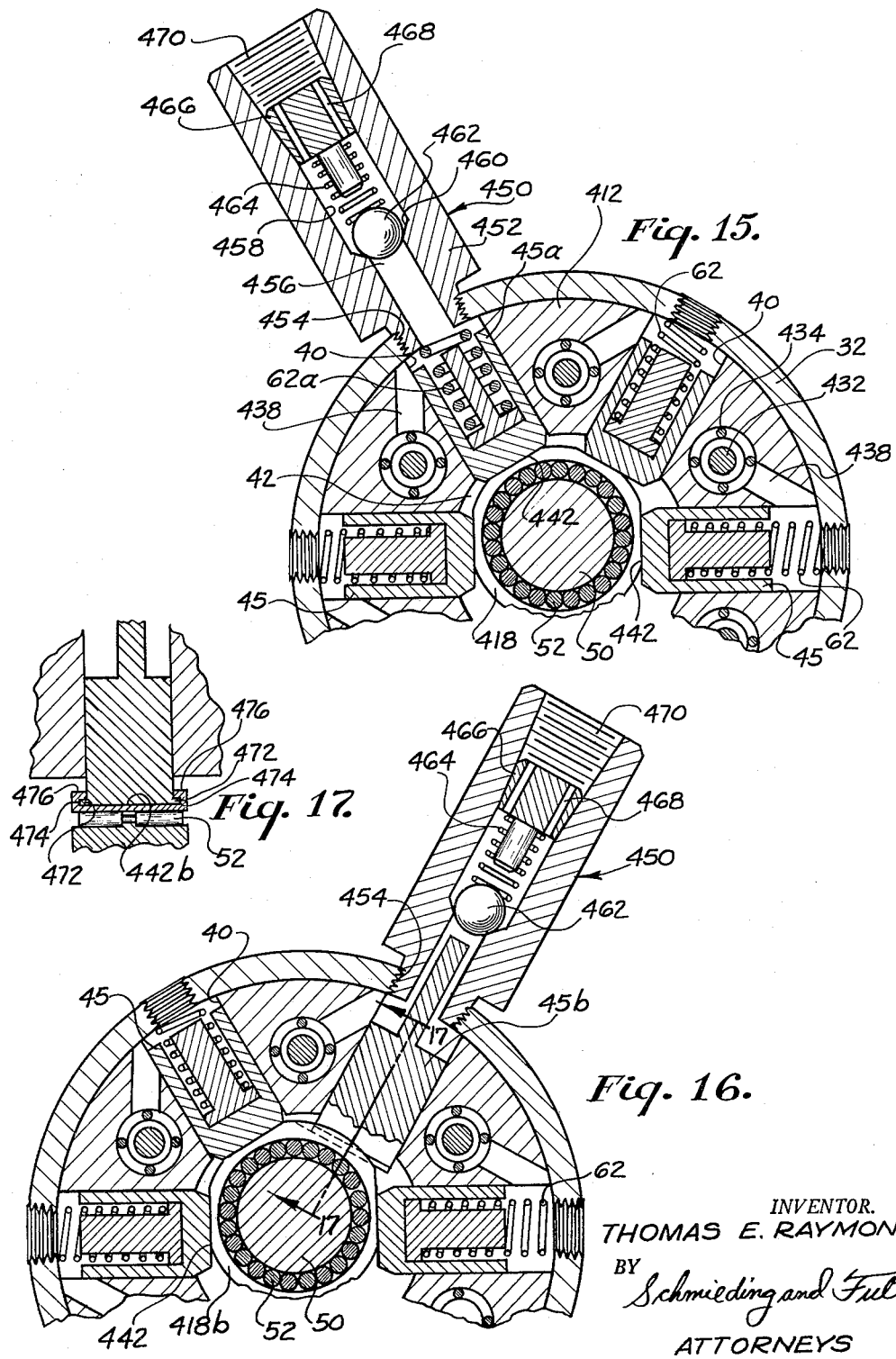

INVENTOR.
THOMAS E. RAYMOND
BY
Schmieding and Fultz
ATTORNEYS

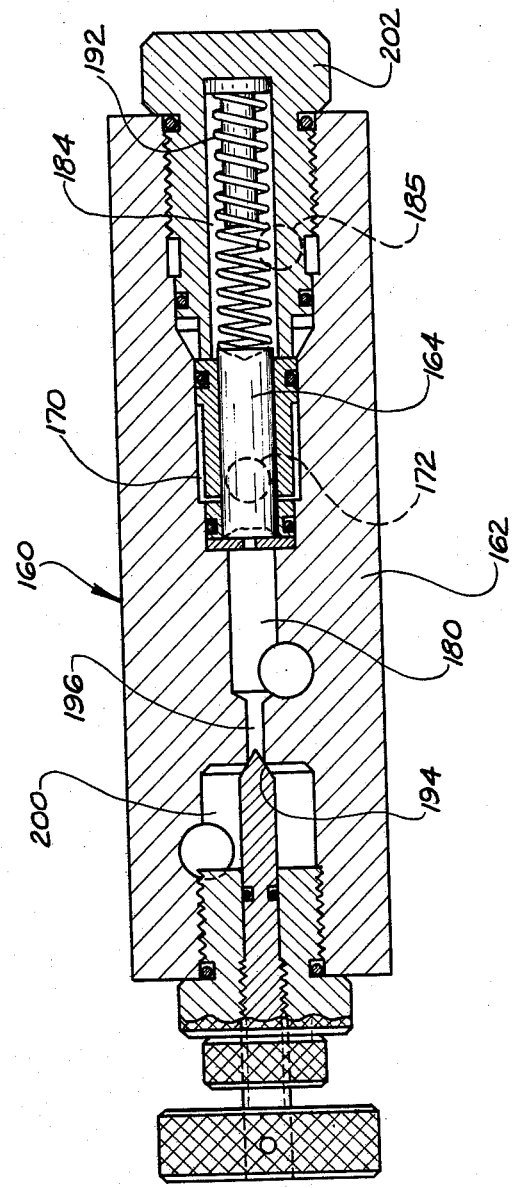

United States Patent Office 3,002,462
Patented Oct. 3, 1961

3,002,462
FLUID TRANSLATING APPARATUS
Thomas E. Raymond, Zanesville, Ohio, assignor, by mesne assignments, to Racine Hydraulics & Machinery, Inc., Racine, Wis., a corporation of Wisconsin
Filed Aug. 13, 1957, Ser. No. 677,912
35 Claims. (Cl. 103—38)

The present invention relates generally to fluid translating apparatus and particularly to novel variable displacement pumps wherein the flow rate of fluid translated can be controlled independently of the speed of rotation of the pump and prime mover therefor. The present application is a continuation-in-part of my copending application Serial Number 450,468, filed August 17, 1954, for fluid translating apparatus, now abandoned.

In general, the apparatus of the present invention comprises a pump, utilizing a movable wall, such as a piston, for effecting the intake and exhaust of fluid, whereby the quantity of fluid translated per cycle is a function of the extent of movement of the movable wall, and as an example is a function of the length of the stroke of the piston.

Inasmuch as it is well known in the art that pumps of this type may comprise a diaphragm or a bellows as constituting the movable wall, it is to be understood that when such term as "piston" is employed, such term should comprehend any type of movable wall.

In the instant application, the stroke of the piston is variable during the operation of the apparatus and the stroke is variable in response to variations in fluid pressure exerted on the head of the piston. Since the stroke is variable in response to variations in fluid pressure, the present apparatus is readily adaptable to constantly maintain predetermined flow characteristics of the fluid being discharged to the load. That is, the flow characteristics can be maintained substantially constant, independent of the speed of rotation of the prime mover which drives the piston. For example, the volume or pressure of fluid being discharged can be maintained substantially constant in installations where the speed of the prime mover fluctuates during operation, or in other applications, the present apparatus can be readily adapted to vary the flow being discharged in response to various desirable variations of flow characteristics of fluid being translated, or in response to fluctuations in a selected operational characteristic of a load to which the apparatus is translating fluid.

More specifically, yieldable force producing means, such as a spring, serves to constantly urge movement of the piston in one direction, and a piston driving means is provided to cyclically move the piston in the other direction. In any type of pump, utilizing the principles of the present invention, the pump body is provided with two chambers, one on one side of the movable wall and one on the other side of the movable wall. One of these chambers is provided with an inlet port and an outlet port for the fluid being pumped and the other chamber is provided with means for moving the wall. In the instant application, I have shown the first mentioned chamber as a cylinder, and the wall as the piston. In one embodiment of the invention, I employ an eccentric for moving the piston in one direction, and in another embodiment I utilize a swash plate for moving the piston in one direction. The chamber containing either the eccentric or the swash plate is sealed from atmosphere and will be hereinafter referred to, at times, as a driving mechanism chamber. The spring, heretofore mentioned, normally urges the piston head into the driving mechanism chamber. It will be understood that with these structural arrangements, the piston serves as a pressure seal between the cylinder chamber and the driving mechanism chamber.

To produce variations in the stroke of the piston, various conditions of equilibrium of forces acting on the intake or suction stroke are produced to effect various stroke limits. Two independent forces act inwardly on the head end of the piston. One of these forces is produced by the intake pressure on the full piston area, and the other of these forces is produced by a spring. Of these two forces, only the one produced by the spring is a function of the displacement of the piston. Inasmuch as the head of the piston extends into the driving mechanism chamber, the pressure in said chamber acts on the full area of the head of the piston in direct opposition to the aforementioned forces. With this arrangement, the spring force must equal the resultant of the oppositely directed fluid pressure forces for equilibrium to exist. It will, therefore, be seen that the piston will be caused to follow the actuating eccentric or swash plate during the suction stroke until the aforementioned equilibrium point is reached. At this point the stroke of the piston will cease and the piston remains in suspension as the eccentric or plate continues on its cycle and until the eccentric or swash plate again reaches the equilibrium point and contacts the head of the piston. At the equilibrium point, the piston is mechanically moved by either the eccentric or swash plate causing the delivery of fluid to the load.

It will be understood that various points of equilibrium can be established by varying the resultant of the fluid pressures acting on the head of the piston, and it follows that variations in said resultant can be produced by varying either of said fluid pressures. Hence, in operation, the apparatus can be adapted for controlled operation conditions, by making either the driving mechanism chamber pressure or intake pressure a function of a desired output characteristic in any arbitrary manner. As a simplified or special operating condition, the intake pressure can be equal to atmospheric or any constant pressure value, and with such arrangement, the variable chamber pressure becomes a direct control pressure. It should be noted that control of the present apparatus is accomplished entirely during intake conditions whereby such control is completely independent of the load pressure or flow except through desired detecting means.

In one aspect of the invention, the pressure differential between that in the chambers can be varied by varying the quantity of fluid taken in to the pumping chamber by providing a restriction in the fluid inlet conduit leading to the pumping chamber while maintaining the pressure in the driving mechanism chamber substantially constant.

In other aspects of the invention, I vary the pressure within the driving mechanism chamber by either variations in the pressure of the fluid being pumped or by the volume of the fluid being pumped, or by a combination of both the pressure and volume of the fluid being pumped.

In still another aspect of the present invention, I provide for connecting the driving mechanism chamber to a source of relatively low pressure such as to drain in the event of a sudden increased load being imposed upon the pump. In carrying out this phase of the invention I provide an accumulator which may be brought into play to supply the excess fluid which is desired at the time that there is a sudden demand for increased fluid by the work machine.

In still another aspect of the invention, I provide for the ready connection of the high side of the pump to a source of low pressure, for example drain, when there is a sudden change from a high demand for fluid to a lower demand.

In the system, aforementioned, in which the pressure within the driving mechanism chamber is varied in response to the flow in the high side of the pumping system, I provide a restrictor in this high side leading to the work machine and utilize the difference in pressures on opposite sides of the restrictor to actuate valve mechanism which causes an increase in pressure in the driving mechanism chamber when there is a tendency of the pump to provide an excessive flow of fluid to the work machine and conversely provides for decreasing the pressure in said chamber when there is a tendency of the pump to decrease the flow of fluid to the work machine.

In another aspect of the invention, I provide a second restrictor in parallel relationship with the first mentioned restrictor which restrictor is normally in parallel circuit, as aforementioned, when there is the proper predetermined flow between the pump and the work machine. A valve is arranged to control this parallel circuit and is adapted to be brought into operation to restrict or stop the flow of fluid in this parallel circuit in the event that the differential in pressure on opposite sides of the first mentioned restrictor rises to a predetermined high value, and since this second mentioned restrictor is then rendered ineffective or substantially ineffective, the pressure immediately increases in the high pressure line between the pump and the first mentioned restrictor, bringing into play immediately the valve which effects the increasing of pressure in the driving mechanism chamber.

In all of these control systems aforementioned, in which the pressure is varied in the driving mechanism chamber, by either the pressure responsive valve or the volume responsive valve, a restrictor is interposed between the high pressure side of the system and the driving mechanism chamber, which latter restrictor performs the function of materially reducing any pulsations in the high pressure side of the system from being imparted to the driving mechanism chamber.

When the present invention is practiced while using a multiple cylinder pump, as for example a pump in which the cylinders and the pistons are arranged radially with respect to the driving mechanism chamber and in which an eccentric is utilized for moving the pistons radially outwardly, I provide a ring surrounding the eccentric and this ring is provided with surfaces which complement the surfaces of the heads of the piston which it engages. In the instant disclosure I provide six radially extending pistons, the outer surface of the heads thereof and which are engaged by the ring, are flat and, of course, the complementing surfaces of the ring are also flat. These complementing surfaces of the piston heads and the ring provide large striking surfaces, the advantage of which will appear hereinafter.

Inasmuch as the conditions may be such that the pistons are forced outwardly by the pressure within the driving mechanism chamber, as distinguished from being driven outwardly by the eccentric ring, to such an extent that the flats on the ring are brought out of alignment, i.e., angularly with respect to the surface of the heads of the piston, I provide what I term a "dynamic key" which I utilize for preventing angular displacement of the ring flat surfaces with respect to the flat surfaces of the piston. In carrying out one aspect of this phase of the invention I utilize one of the pistons as the "dynamic key." In one aspect of the invention this piston and of course the cooperating cylinder does not function as a pump in that I provide for interconnecting the normal compression chamber of the cylinder with the driving mechanism chamber, that is fluid freely passes between these two chambers and a spring is utilized for forcing this piston radialy inwardly so that it is in constant contact with its respective flat surface of the eccentrically driven ring. In another aspect of this invention this "dynamic key" piston can be used as part of the pumping system by providing a compression spring of such compression value as to more than balance the differential in pressure on opposite sides thereof, that is, the strength of the spring is such that the piston head, upon which it acts, is maintained in constant contact with its respective contacting surface on the eccentrically driven ring. In this embodiment, variation in flow or pressure in the high side of the system is effected solely by the other five pistons.

In still another aspect of the invention the "dynamic key" is tied to the ring in such a manner that it is pulled radially inwardly cyclically although the other five pistons are forced away from their respective ring rurfaces by pressure within the driving mechanism chamber. In this embodiment the "dynamic key" piston can also be utilized as a pump element and function as such, and the flow of fluid from the pump is varied by varying the length of the stroke of the other five pistons.

In still another aspect of the use of the "dynamic key," I provide that the "dynamic key" functions at times as a pump element and at other times as a "dynamic key" for holding the ring in position. In this aspect of the invention, a conduit is arranged to connect the compression chamber of the cylinder of this "dynamic key" and the driving mechanism chamber. This conduit is normally closed, but before the pressure in the driving mechanism chamber approaches such a high value that the pistons are extended radially outwardly to such an extent that the ring may be displaced, this valve is moved so as to establish free communication on opposite sides of the piston whereby the fluid is merely moved back and forth between the two chambers and the normal spring, utilized for forcing the piston inwardly, retains this "dynamic key" piston in constant engagement with its respective complementing surface on the eccentrically driven ring.

Further objects and advantages will be apparent from the following description, reference being had to the accompanying drawings wherein preferred embodiments of the invention are illustrated.

Figure 1:
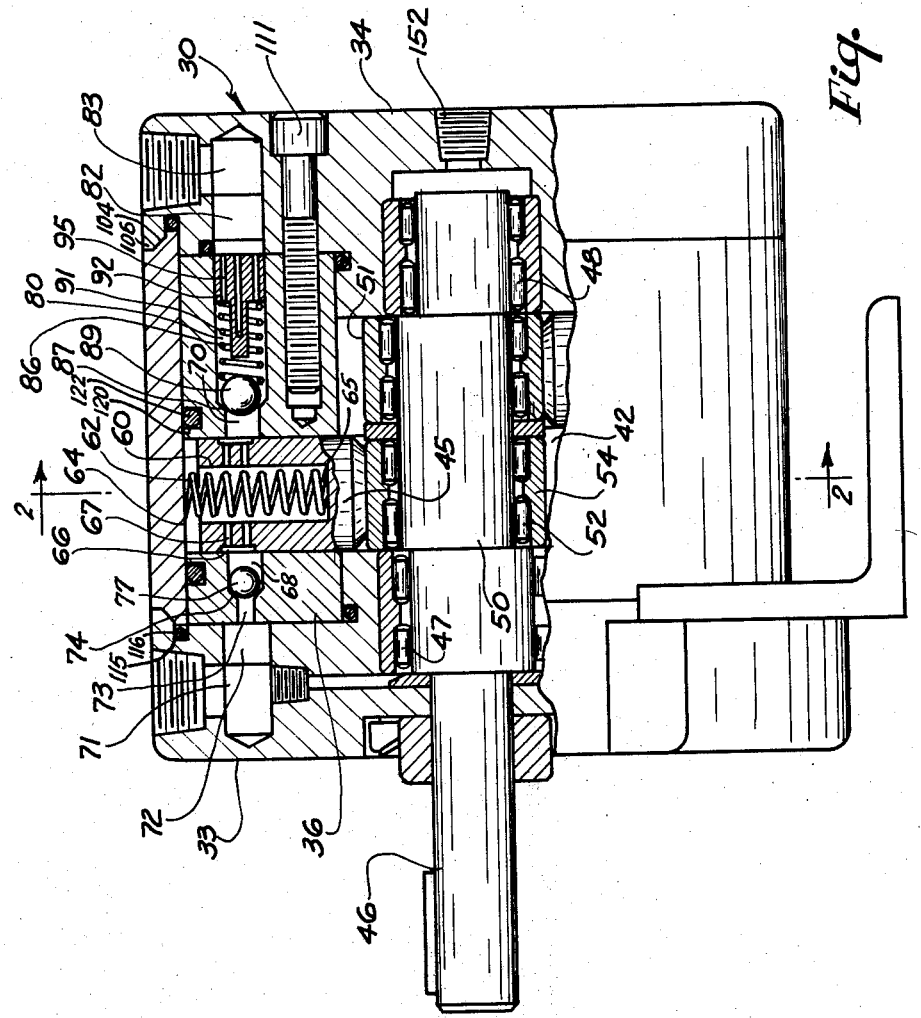
FIG. 1 is a side view, partly in section, of a fluid translating apparatus constructed according to the present invention, with the section being taken substantially along the line 1—1 of FIG. 2.
Figure 5:
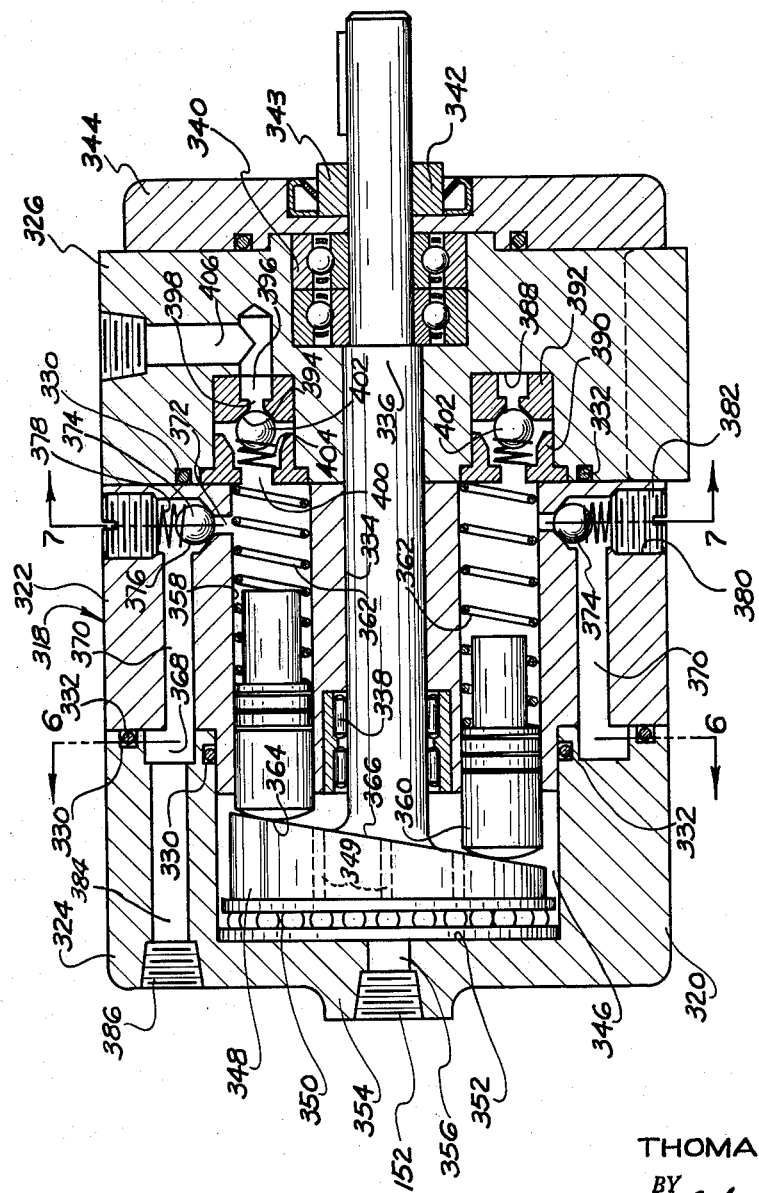
FIG. 5 is a longitudinal sectional view of a swash plate type pump showing the driving shaft, the swash plate and two of the pistons in elevation, the section being taken substantially along the line 5—5 of FIG. 7.
Figure 6:
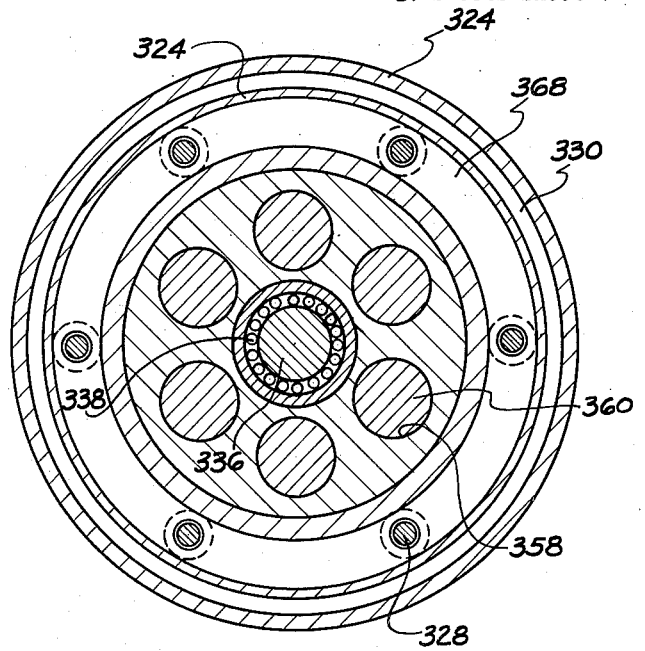
Figure 7:
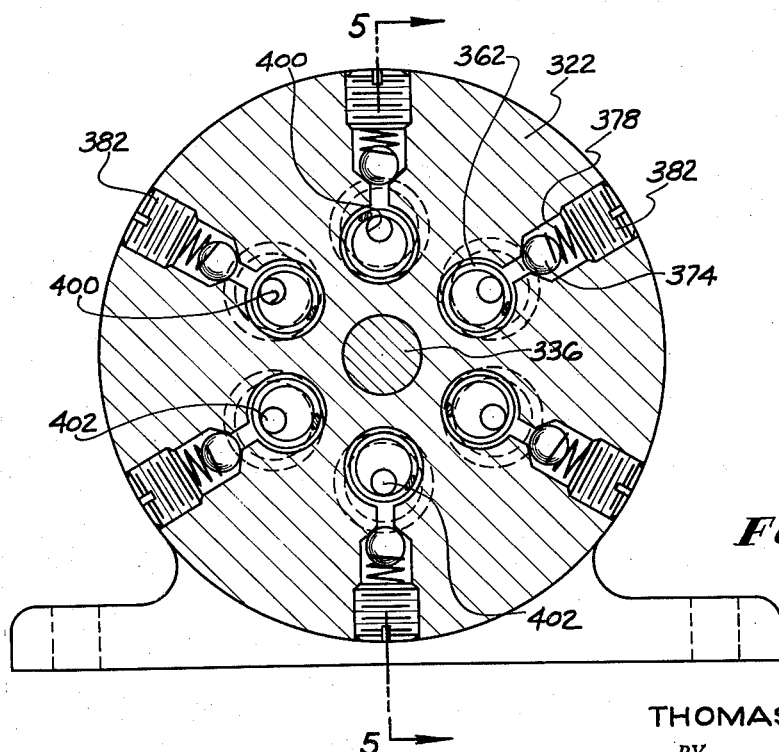
Figure 8:
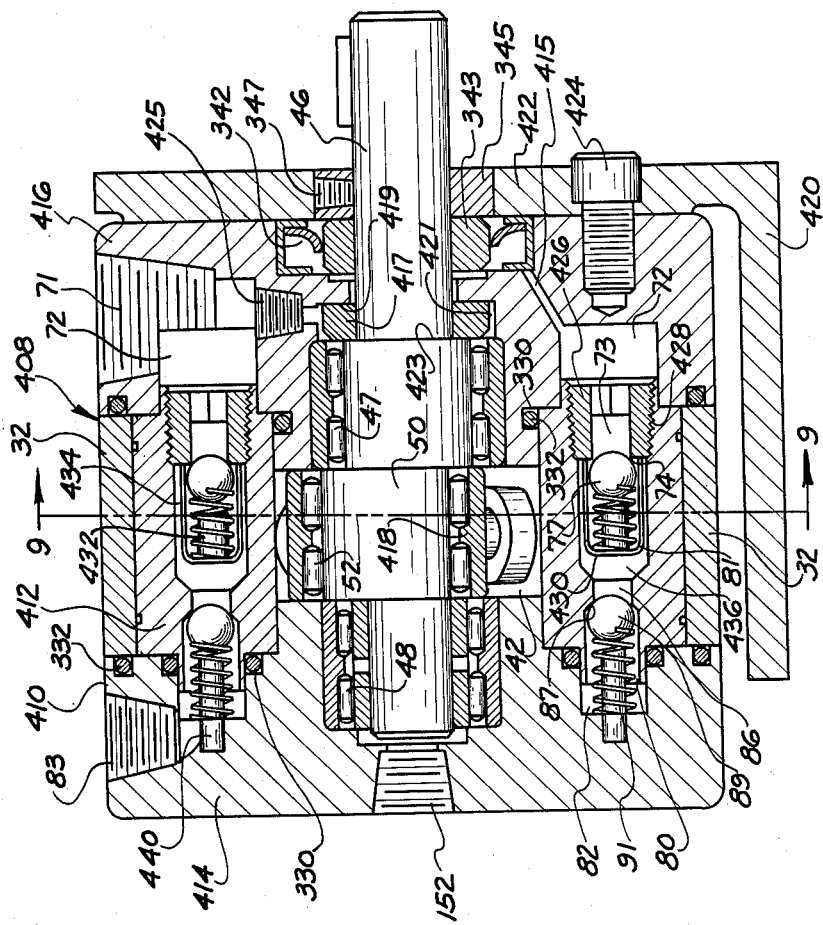
Figure 9:
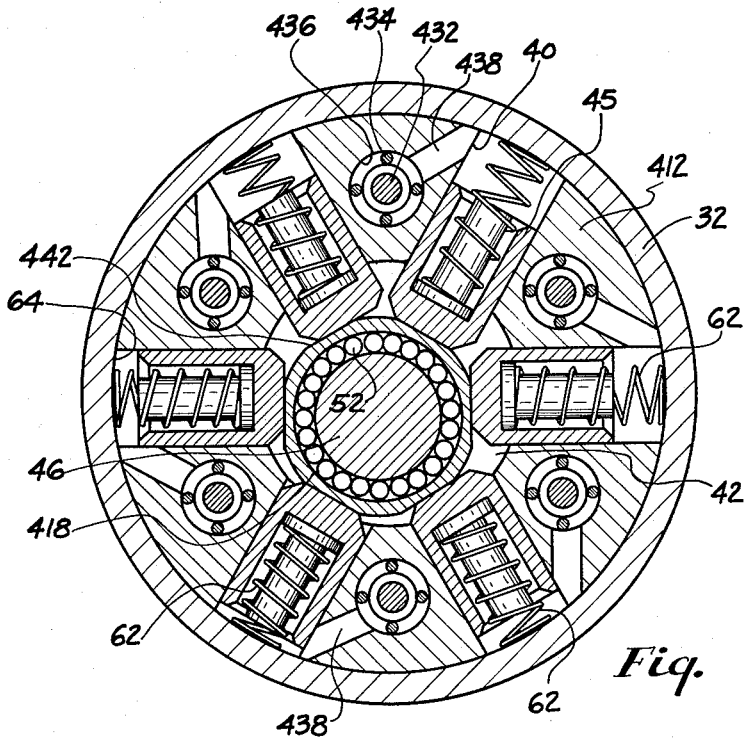
Figures 10, 11, 12:
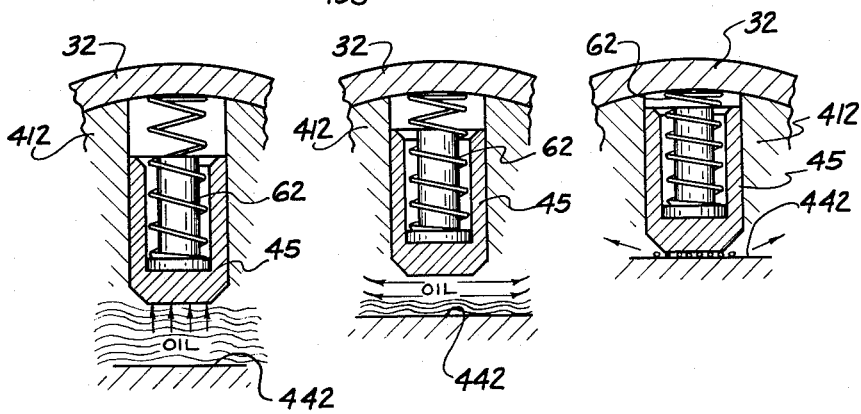
Figure 13:
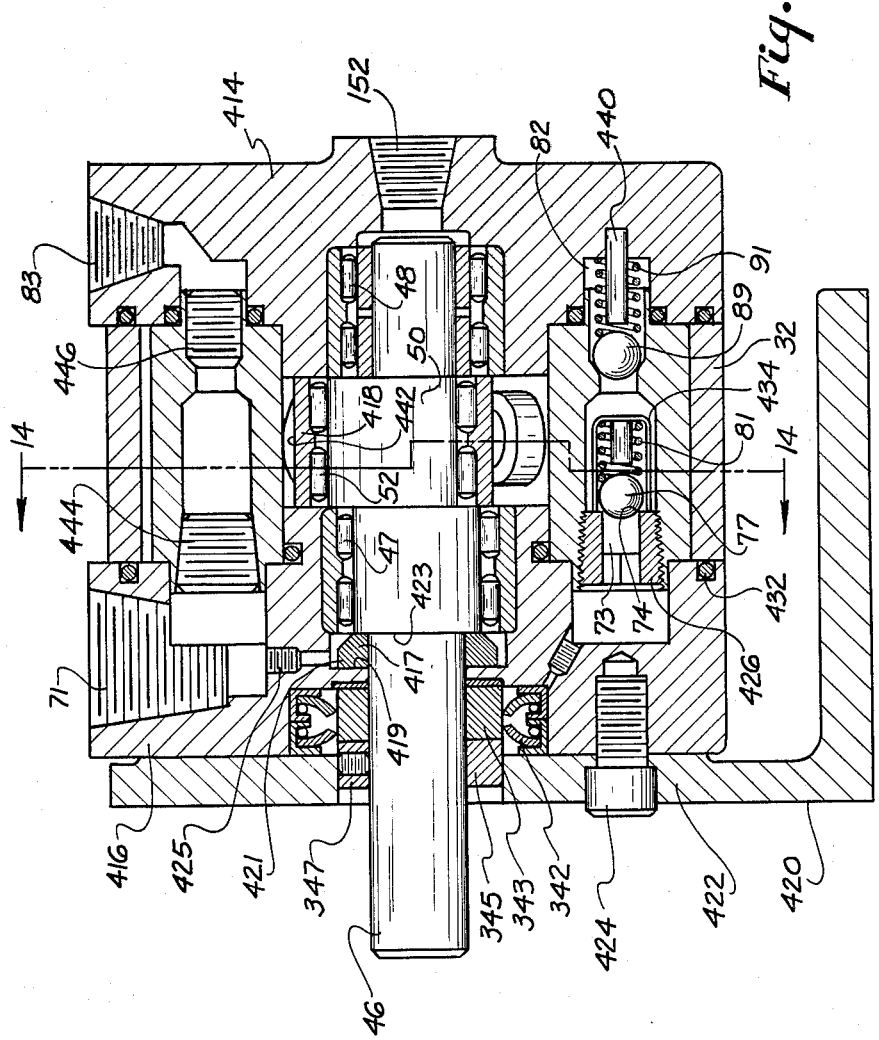
Figure 14:
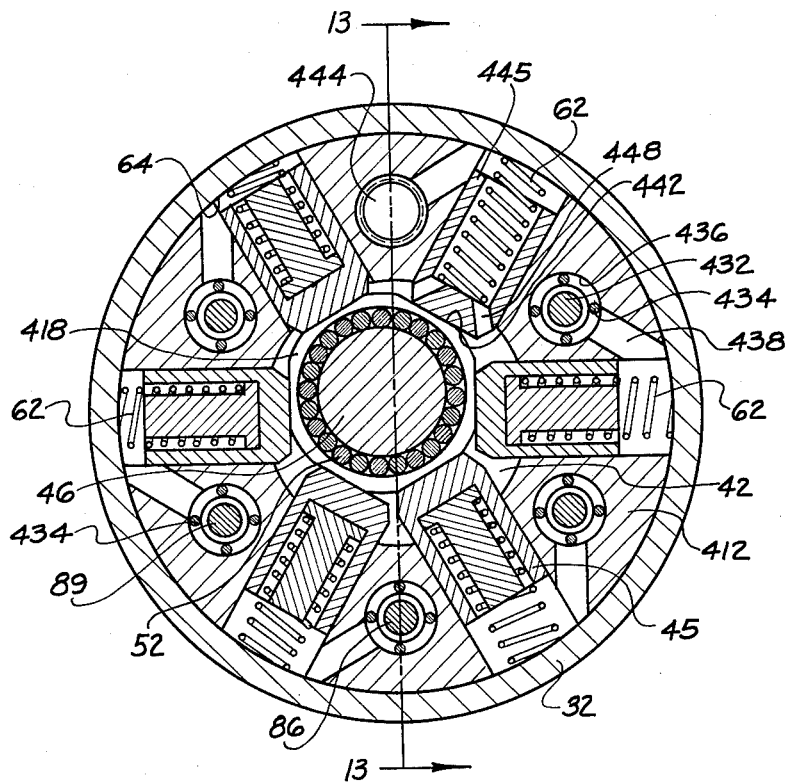
Figure 18:
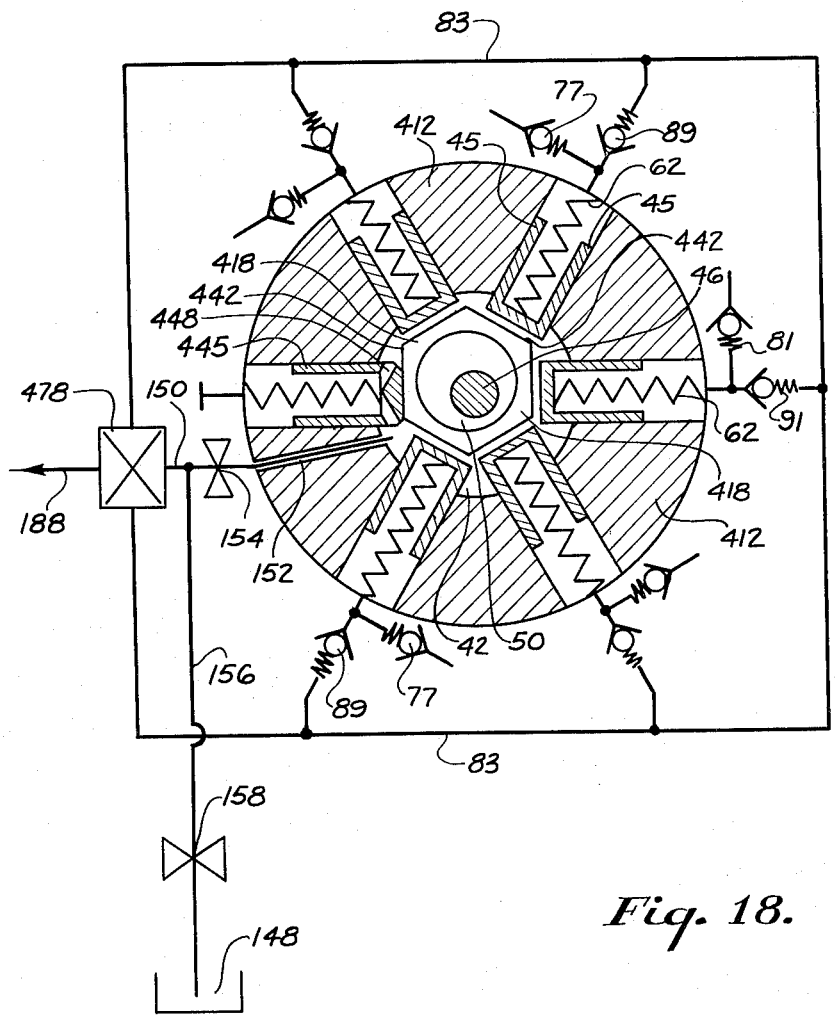
Figure 19:
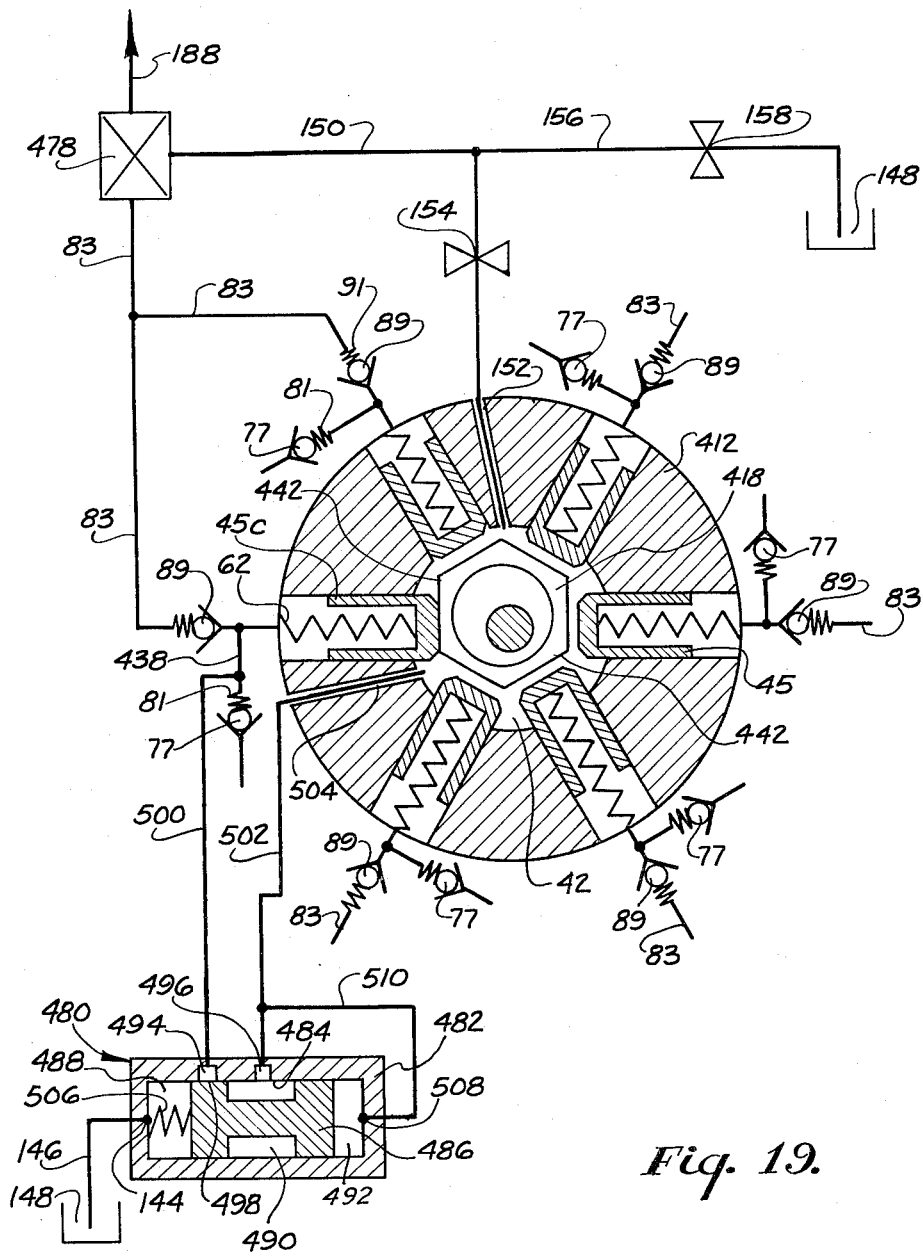
Figure 20:
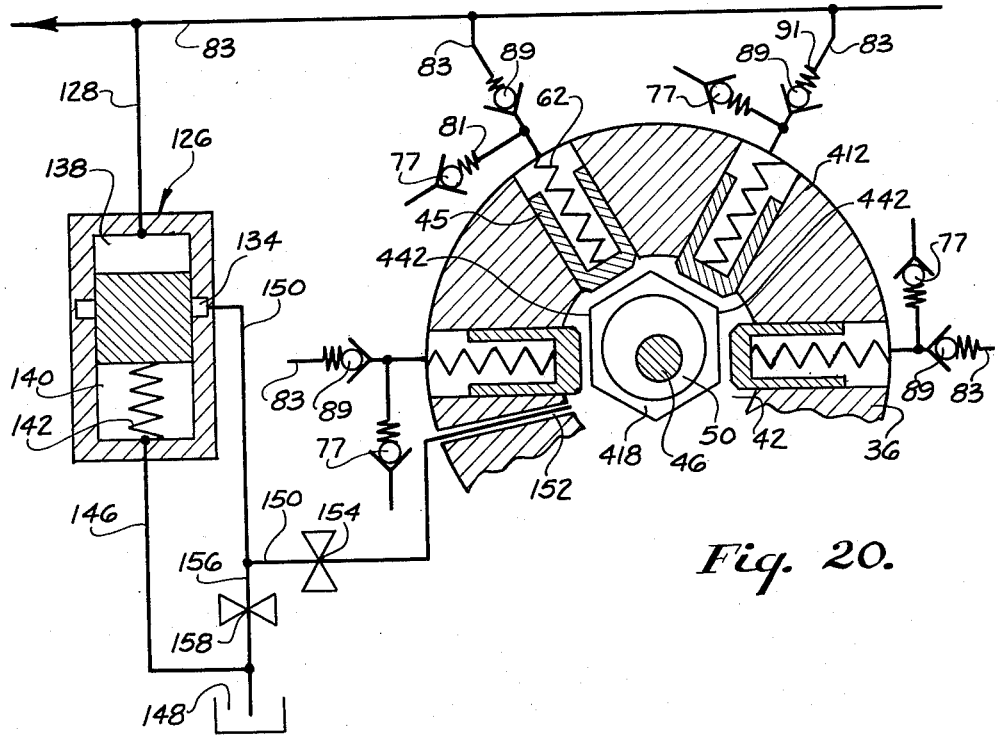
Figure 21:
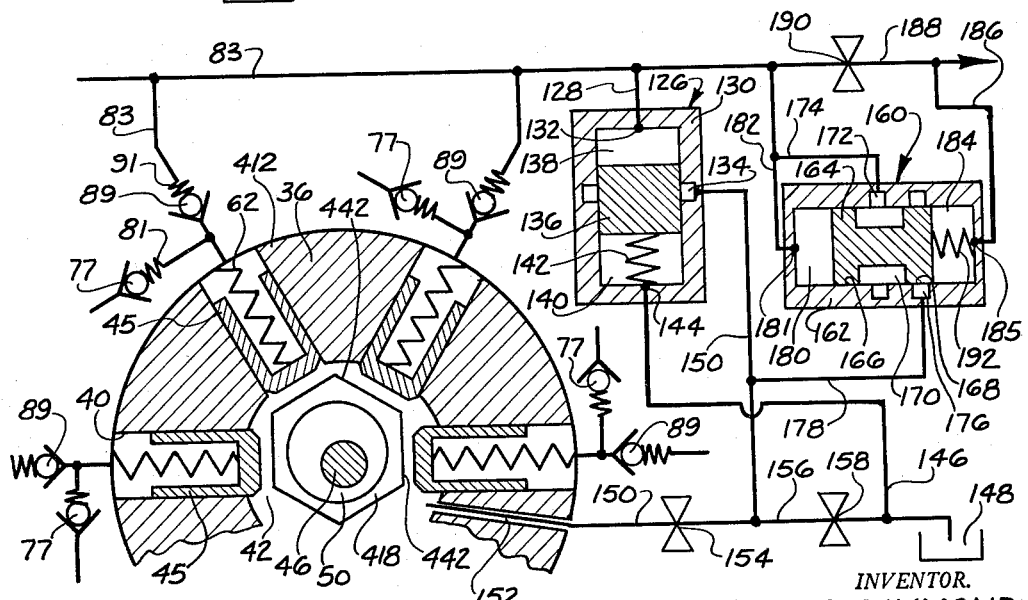
Figure 22:
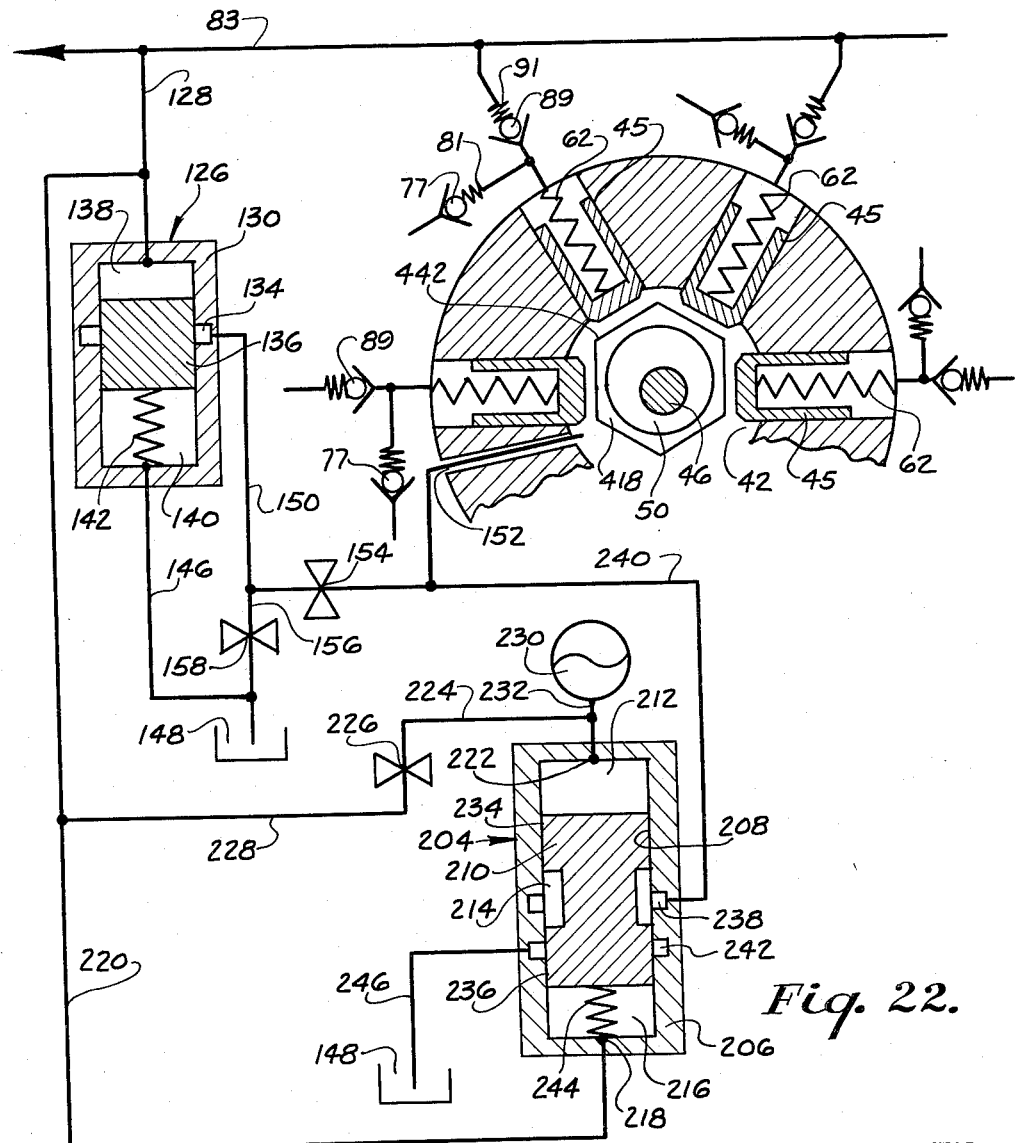
Figure 23:
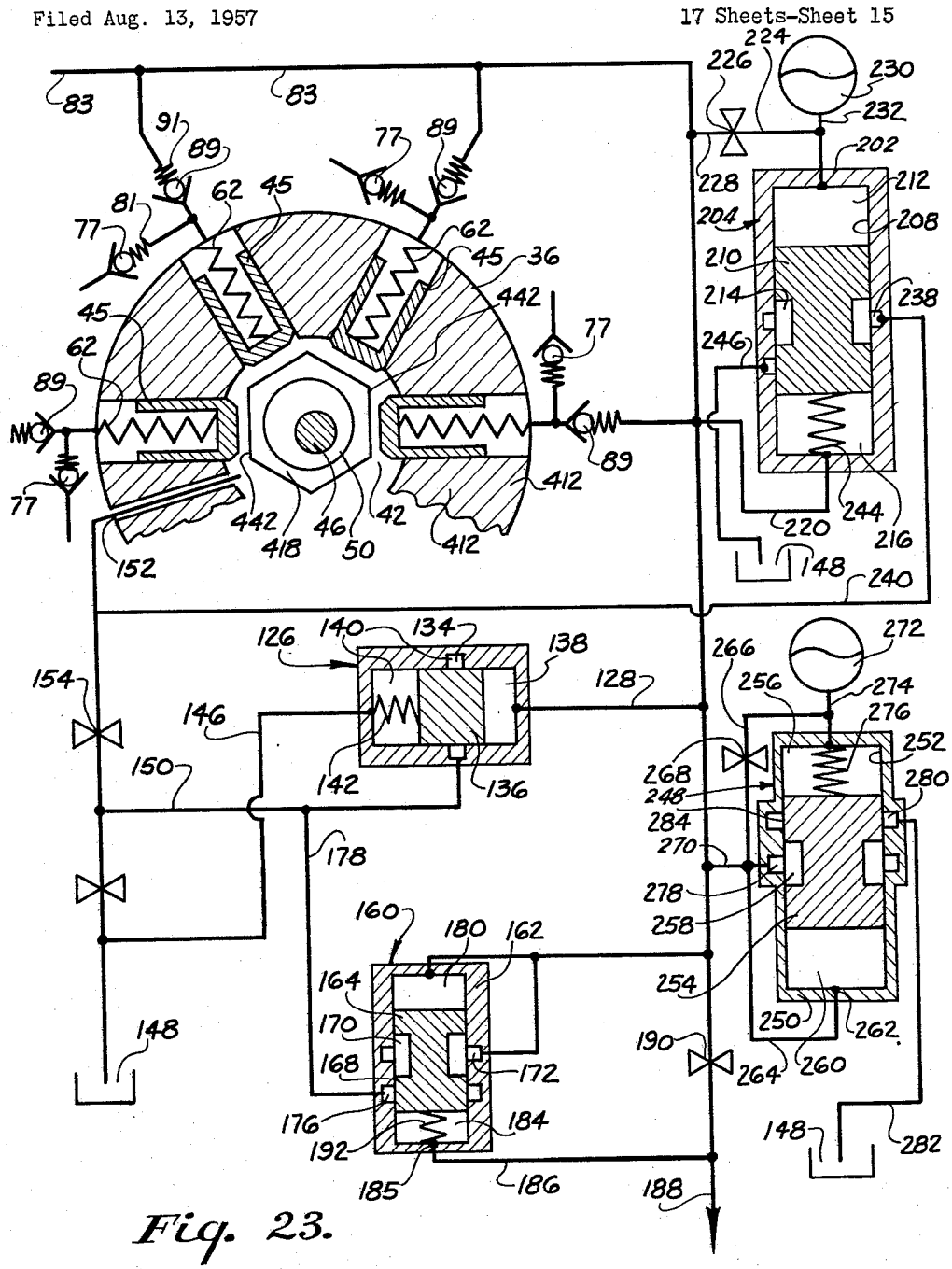
Figure 24:
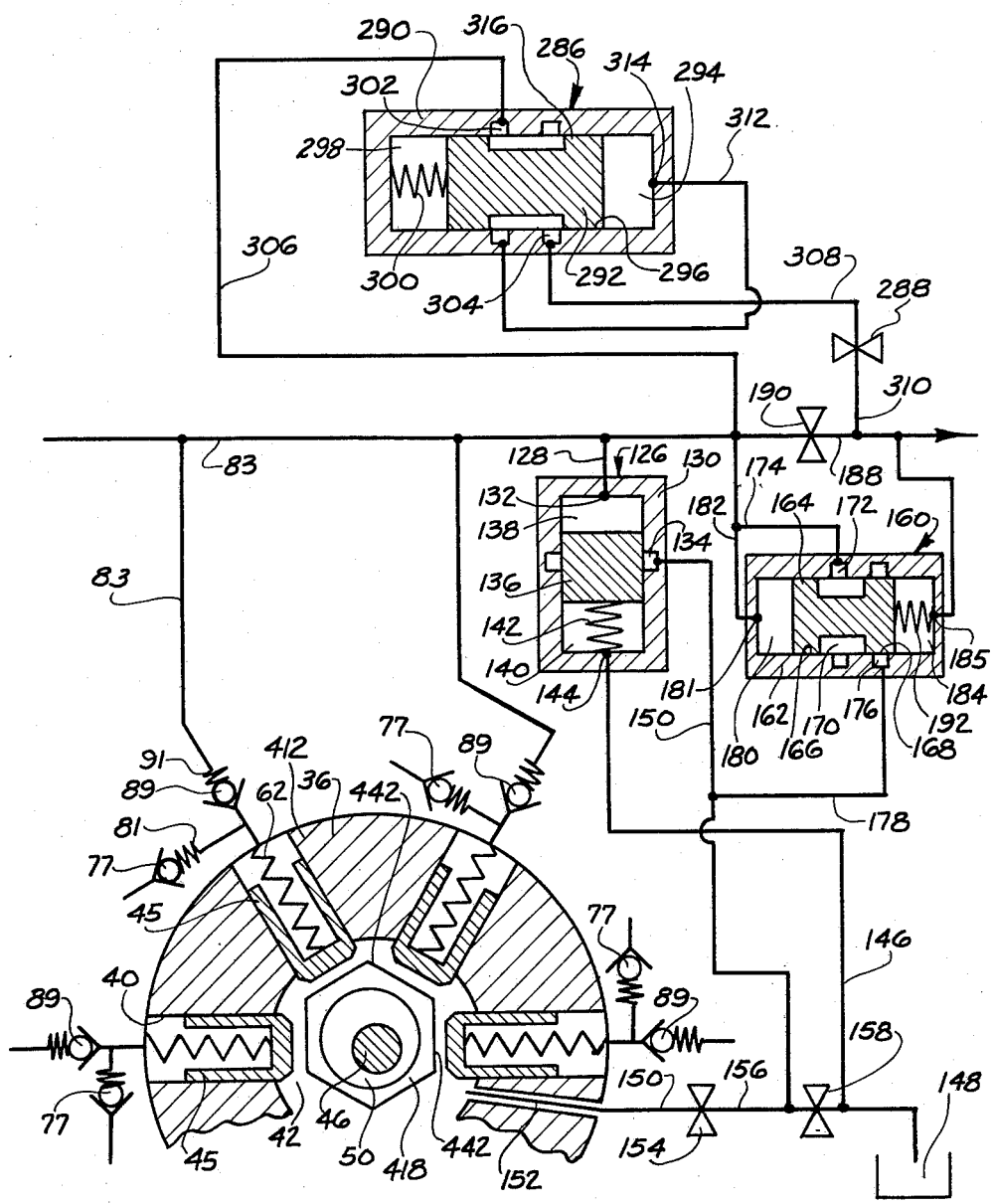

FIGS. 6 and 7 are sectional views taken, respectively, along lines 6—6 and 7—7 of FIG. 5;

FIG. 8 is a longitudinal sectional view similar to FIG. 1, that is, showing a radial type pump, the driving shaft and eccentric being shown in elevation;

FIG. 9 is a sectional view taken substantially along line 9—9 of FIG. 8;

FIGS. 10, 11 and 12 are fragmentary sectional views of the cylinder, piston and eccentric ring, the views showing different positions of the eccentric ring with respect to the pistons;

FIG. 13 is a view similar to FIG. 8 but looking in the opposite direction and showing plugs substituted for the inlet and outlet valves of one of the cylinders;

FIG. 14 is a view similar to FIG. 9 but showing the "dynamic key," that is, one of the pistons functioning as a means for preventing the displacement of the eccentrically driven ring, the section being taken substantially along the line 13—13 of FIG. 14;

FIG. 15 is a fragmentary view in section similar to FIG. 13 but showing the "dynamic key" as one which also functions as a pump element;

FIG. 16 is a view similar to FIG. 15 but showing the embodiment in which the "dynamic key" is tied to the eccentrically driven ring;

FIG. 17 is a fragmentary sectional view taken substantially along the line 17—17 of FIG. 16;

FIG. 18 is a schematic diagrammatic view of the pumping system employing a "dynamic key" and employing one form of valve for feeding back fluid to the eccentric or driving mechanism chamber;

FIG. 19 is a schematic diagrammatic view of the pumping system showing the feed back control valve and showing a control system in which the "dynamic key" at times functions as an element of a pump and at other times in which its sole purpose is that of retaining the eccentrically driven ring in proper position;

FIG. 20 is a schematic diagrammatic view of the pumping system in which the pressure within the eccentric chamber is controlled slowly by the pressure on the high side of the pump;

FIG. 21 is a view similar to FIG. 20 but includes in addition to the pressure control, a valve which also controls the pressure within the eccentric chamber, the valve being responsive to the differential in pressure in the high side of the pump on the opposite sides of a restrictor;

FIG. 22 is a view similar to FIG. 20 but in which a valve mechanism is employed which has the dual function of utilizing an accumulator for supplying fluid to the high pressure side of the system and for substantially instantaneously reducing the pressure within the eccentric chamber when there is an exceptionally large instantaneous excess demand for fluid from the pump;

FIG. 23 is a schematic diagrammatic view similar to FIG. 22 but in addition includes the valve which is responsive to the differential in pressure on opposite sides of the restrictor in the main line and also includes a valve which releases the pressure on the high pressure side of the pump in the event that there is a sudden lessening demand for the flow of fluid in said high pressure line;

FIG. 24 is a view similar to FIG. 21 but showing a restrictor in parallel with the main restrictor in the high pressure line leading to the work machine and a valve which is responsive to pressure on the pump side of the restrictor for controlling the flow of fluid through the second mentioned restrictor; and FIG. 25 is a longitudinal view of one of the valves used in the system.

Figure 2:
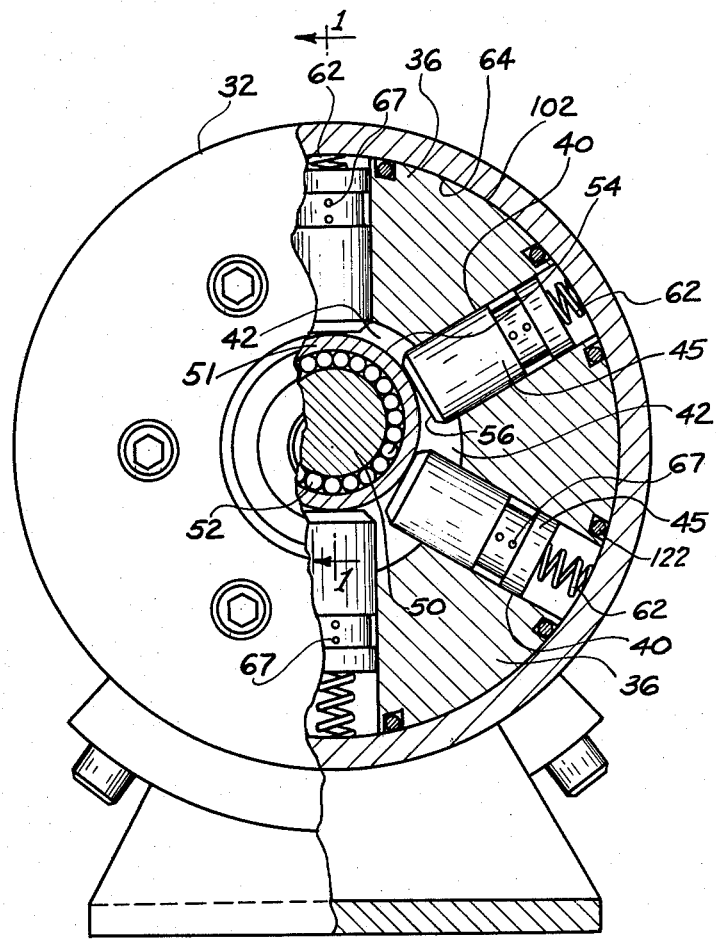
FIG. 2 is an end view, partly in section, of the apparatus of FIG. 1 with the section being taken substantially along the line 2—2 of FIG. 1.

Referring more in detail to the drawings and particularly FIGS. 1 and 2, there is shown a fluid translating device 28 including a casing 30. Casing 30 includes a cylindrical shell portion 32 which is closed at one end by an end plate 33 and at the other end by an end plate 34. The shell portion 32 surrounds a piston block 36, which piston block is formed with a plurality of radially extending passages which form a plurality of cylinders 40. The inner end of each of the cylinders opens into a common chamber 42, herein referred to generally as a driving mechanism chamber and more specifically as an eccentric chamber. A plurality of pistons 45 are mounted for reciprocating movement in the cylinders, one for each cylinder.

A shaft 46 is rotatably carried by the end plates 33 and 34 of the casing 30 by bearings 47 and 48. The shaft 36 is provided with eccentric portions 50, each of which includes an outer ring 51 rotatably carried on an eccentric portion by bearings 52. Each eccentric ring 51 includes an outer surface 54 which is engageable with an end surface 56 of the pistons 45 so as to impart radial outward movement to the pistons upon rotation of the shaft 46. Each of the pistons 45 is provided with a longitudinally extending cavity 60 drilled inwardly from the outer end of the piston, and a spring 62 is carried in each of the piston cavities, in compressed configuration between an inner surface 64 of the casing shell 32 and a bottom surface 65 of the piston cavity 60. Hence, it is seen that the springs 62 serve to constantly urge movement of the pistons radially inwardly against the outer surfaces 44 of the eccentrics.

An annular passage 66 extends peripherally around each piston near the outer end thereof. A plurality of passages 67 connect the annular passage with the piston cavity 60. Hence, for any possible position of piston rotation, relative to its respective cylinder, fluid passage means is provided between the intake passage 68, and the cavity 60, and the interior of the outer portion of the cylinder. In a similar manner, fluid is discharged from the cavity 60 through the annular passage 66, and to the outlet passage 70. With this arrangement, wherein the inlet and outlet fluid passages are disposed transversely, to the direction of stroke of the piston, the fluid actually passes through the side walls of the pistons in entering and leaving the cylinders. Such arrangement provides a high degree of compactness for any given piston stroke length, and makes possible high compression ratios for the size requirements of the apparatus.

An opening 71 is formed in the casing and plate 33, such opening providing an intake for fluid which leads to an annular intake manifold 72. Each of the cylinders 40 communicates with the intake manifold 72 by intake passage 73. A valve seat 74 is provided in each intake passage 73 by a countersink as at 68 and a ball 77 is confined freely in the countersink of each intake passage 73, with each ball 77 cooperating with a seat 74 to form an intake valve. It will be observed that the side walls 78 of the pistons 45 serve as ball confining end walls to retain the balls 77 in the countersinks 76, and this although the pistons 45 are at the inner end of their strokes.

Referring next to the outlet valve construction, it is seen that such outlet valve includes a discharge passage 70 which connects the cylinder 40 with an annular discharge manifold 82 through a valve, to be described. An outlet passage 83 leads from the discharge manifold 82 to the exterior of the pump and each passage 83 is connected with piping leading to the load or work machine to which the apparatus translates fluid. Each outlet passage 70 is enlarged as at 80, to form a seat 87 for a ball 89. A spring 91 is retained between a spring retainer 92 and the ball 89 to constantly urge closure of ball 89 against the seat 87. Hence the outlet valves are normally urged towards closed position by the compression springs 91, each outlet valve 89 being openable responsive to pressure exerted by a piston discharging fluid from a cylinder.

The fluid translating apparatus of this embodiment of the invention includes a front bank of radially extending cylinders adjacent to end plate 33 and a rear bank of radially extending cylinders adjacent the end plate 34. Hence the fluid discharging passages, leading from the rear bank of the cylinders to the discharge manifold 82, are shorter than the fluid discharge passages leading from the front bank of the cylinders. Accordingly, the spring retainers for the outlet valves of the front bank of cylinders are not recessed as deeply into the end plate 34 as are the spring retainers for the outlet valves of the rear bank of cylinders. Hence, the valve spring retainers, for the rear bank of cylinders, can be located rearwardly of the discharge manifold 82 whereby the discharge passages for such rear bank of cylinders communicate directly with the discharge manifold 82. In the case of the front bank of cylinders, however, the spring retainers are mounted forwardly of the discharge manifold 82 and a plurality of holes 95 are drilled through the spring retainers 92 so as to permit the passage of fluid from the discharge passages from the front bank of the cylinders to the discharge manifold 82.

An inner surface 64 of the cylindrical casing shell 32 is adapted to slide over and confront an outer surface 102 of the piston block 36. Each end of the casing shell 32 is provided with an inclined surface 104 which extends circumferentially of an end of the casing shell, and each of the end plates 33 and 34 is formed with a shoulder 106 which is adapted to engage a respective inclined surface 104. When the casing and plates 33 and 34 are forced inwardly, during assembly of the apparatus by screws as at 111, the shoulders will produce a radially inwardly wedging action against the inclined surface 104. Such wedging action serves to retain the inner surface 102 of the casing shell 32 in sealed relationship with the outer surface 102 of the block 36 against the outwardly exerted fluid pressure exerted on the casing shell 32 when the pistons extend outwardly in discharging fluid from the cylinders.

A circular groove 115 is formed in each end plate 33 and 34 at each of the shoulders 106. A compressible annular sealing ring 116, which may be formed of a soft metallic material or the like, is disposed in each groove 115 to form a seal against fluid leakage between the casing shell 32 and the casing end plates 33 and 34. Hence, when the screws as at 111 are tightened, during assembly of the apparatus, the sealing rings 116 will be compressed between the casing shell 32 and the casing end plates 33 and 34, simultaneously with the above described radially inward wedging action exerted on the casing shell 32.

A novel positive seal is provided between each open cylinder end and the confronting inner surface 64 of the casing shell 32 at the junction of the radially outward end of each cylinder 40. Such seal includes a sinusoidally extending groove 120 formed in the outer wall 102 of the cylinder block 36. The seal further includes a compressible member 122 formed of synthetic rubber or the like which member is carried in the groove 120. The member is of a normal uncompressed thickness slightly greater than the depth of the groove whereby such member 122 is retained compressed in the groove 120 by the inner surface 102 of the casing shell 32 to form a seal against fluid leakage from the cylinder being sealed. The groove 120 is formed sinusoidally so that it extends circumferentially wherein a respective outer cylinder opening to form an efficient seal against leakage of fluid from the cylinder being sealed thereby.

In operation, the shaft 46 is driven by a prime mover which causes radially outward movement of the pistons in the cylinders. The pistons are moved radially inwardly under the compression forces exerted by the springs 62. The inward stroke of each piston serves to draw fluid inwardly through the inlet passages 71, 68 and 73, opening valve 77. The fluid then enters the annular passage 66 in the pistons, whence it passes through piston passages 67 in to the piston cavities 60.

After fluid is drawn into a cylinder on the inward stroke of the piston, such piston is thereafter driven radially outwardly by the eccentric. Fluid is forced against the ball 89 of the outlet valve, which ball or valve is open to admit the discharge of fluid into the annular outlet manifold 82. The fluid is then driven outwardly through passage 83 to the load being driven by the apparatus.

In negotiating an inward stroke, the inner end of each piston, in being exposed to chamber 42, will be subjected to the pressure of the fluid in such chamber. If the pressure in chamber 42 is sufficiently low, as compared to the combined effect of the compression force of the return spring 62 and the fluid pressure in the outer end of the cylinder, then the piston will negotiate a relatively long stroke, the maximum stroke length occurring when the inner end or the head end of the piston continuously contacts the outer surface of its respective eccentric.

If the fluid pressure in chamber 42 is increased to beyond the maximum stroke conditions set forth above, that is to a fluid pressure value at which the combined effect of the spring 62 and the pressure in the outer end of the cylinder is insufficient to completely return the piston to its inner limit of travel, the piston will no longer continuously contact its respective eccentric throughout the entire cycle of rotation of the eccentric or reciprocation of the piston, and the inward limit of piston travel will be pneumatically, if gas is employed as a fluid, or hydraulically if a liquid is employed as a fluid, established by the fluid pressure in chamber 42, as compared to being mechanically established by the eccentric surface as was the case with the low eccentric chamber pressure condition previously described.

As the pressure in eccentric chamber 42 is progressively increased in magnitude, relative to the combined effect of the return spring 62 and the fluid pressure in the outer end of the cylinder, the stroke of the piston will be progressively shortened, and an operating condition is reached wherein the head end surface of the piston is mechanically engaged only by the most offset portions of the eccentric. At such operating condition, the fluid pressure chamber exerts a limiting effect on the length of the stroke of the piston and this length of the stroke is governed by the pressure differential between that in the eccentric chamber and that which is radially inwardly exerted on the piston.

Figure 3:
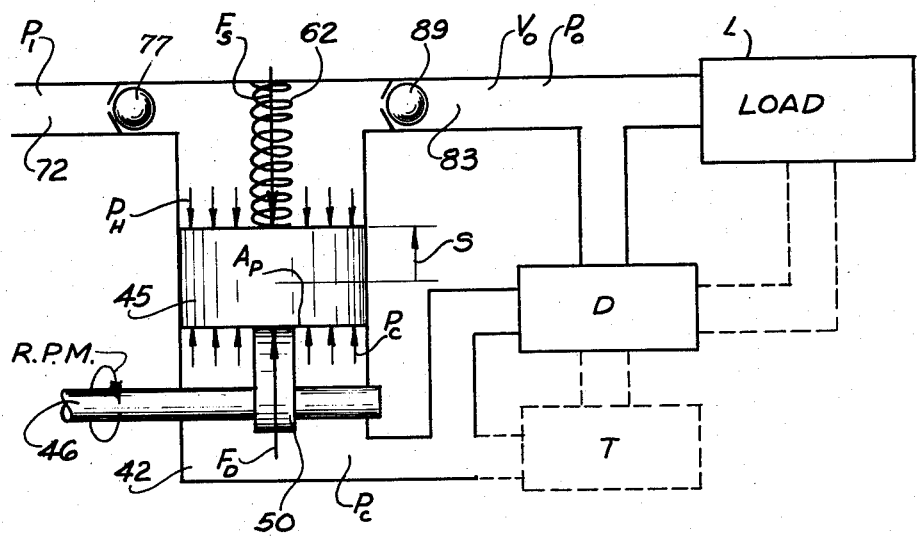
FIG. 3 is a schematic diagram showing an application of the present fluid translating apparatus.
Figure 4:
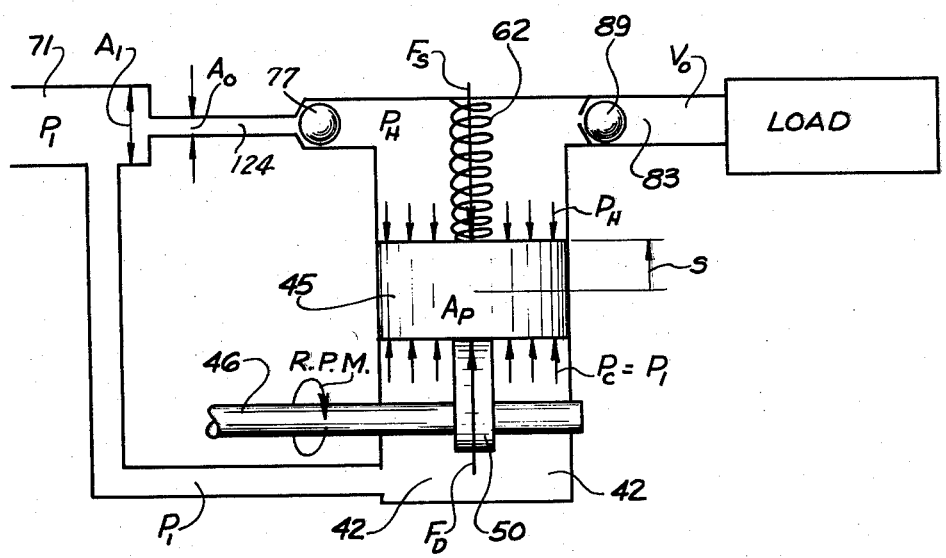
FIG. 4 is a second schematic diagram showing another aspect of the present invention.

Reference is next made to FIGS. 3 and 4 wherein control operations of the present apparatus are diagrammatically illustrated. Certain of the main structural elements are schematically illustrated in these views. In addition certain new elements are schematically illustrated consisting of a load L, a detector mechanism D, and a transducer mechanism T. In addition, certain pressure, force, and flow characteristics are indicated by appropriate alphabetical designations.

Referring first to FIG. 3, fluid is discharged through the outlet passage or line 83 to a load L which may, for example, consist of a fluid motor. A detector D is connected to the discharge line 83 for detecting variations in a flow characteristic, such as variations in discharge volume VO or variations in discharge pressure PO. The detector D is connected back to eccentric chamber 42 of the apparatus and serves to detect variations in the desired discharge flow characteristics and to produce a proportional variation in the pressure PC in the chamber 42. If a constant discharge pressure PO is to be maintained, the transducer T, indicated by dotted delineation, need not be employed, since the transducer is required only when the operational characteristics to be maintained is other than a pressure function of the discharge fluid. When the operational characteristics to be maintained is other than a fluid pressure function, such as shaft r.p.m. at the load L, then detection is taken directly from the load L and fed back along the dotted circuit including transducer T which serves to transduce variations from the desired load characteristics, into proportional variations in pressure PC in the chamber 42. Hence it is seen that with the general case of a controlled operation of FIG. 3, operational characteristics in the eccentric chamber pressure PC are imposed on the apparatus, which sets variations being produced as a controlled function of variations in pressure PO of the fluid being discharged, or in instances where the transducer T is employed, the imposed variations in chamber pressure PC are caused to become a transduced function of variations in a selected operational characteristic of the system, which characteristic may be independent of the discharge pressure PO.

Referring next to the aspect of control illustrated in FIG. 4, it will be noted that the eccentric chamber 42 is connected directly to the intake line 71 whereby the chamber pressure PC is maintained equal to the intake pressure PI at 71. The pressure PI and hence the eccentric chamber pressure PC, may be at atmospheric pressure in instances where no pressure head is present in the intake line, or, in other instances the intake line can be supercharged, in which latter event the pressure PI and the chamber pressure PC will be the same and be above atmospheric pressure.

A restriction in the form of a restricted passage 124, or orifice, is located intermediate the intake line 71 and the interior of the cylinder, the pressure in the outer end of the cylinder being designated PH. A cross-sectional area AO of the restrictor is less than the cross-sectional area AI of the intake line. With this arrangement, the volumetric intake of fluid is a function of the size of the orifice cross-sectional area AO, and, variations in r.p.m. of shaft 46 will not effect any substantial volumetric variations in fluid discharge to the discharge line 80 since when the r.p.m. of shaft 46 is increased the amount of fluid translated by each stroke of the piston 45 will decrease in volume, and, when the r.p.m. of shaft 46 is decreased, the amount of fluid translated by each stroke will increase in volume, but in either instance the volumetric discharge of fluid, with respect to time, will remain substantially constant notwithstanding variations in r.p.m. of shaft 46.

Hence it is seen that in the operation of FIG. 4, the volumetric discharge of fluid, with respect to time, of the apparatus of the present invention will be independent of the shaft r.p.m., and hence independent of the speed of the prime mover by which the present apparatus is motivated.

In considering the operation of the present apparatus, and the diagrams of FIGS. 3 and 4, it is of value to consider certain formulae. Since the piston return spring 62 exerts a variable force F-S, the magnitude of such force for any position of piston stroke is expressed by the following:

$$F-S = K(S-O+S)$$

where K represents the spring rate, S-O represents the initial linear compression of the spring, and S represents the stroke of the piston which varies between S-minimum and S-maximum.

It will be understood that to effect equilibrium of forces the following relationship must exist:

$$F-S+(P-H \times A-P)=(P-C \times A-P)$$

where P-H and P-C represent the head and chamber pressures and A-P represents the area of the piston means.

By substitution $$K(S-O+S)+(P-H \times A-P)=(P-C \times A-P)$$

or $$S=(P-C-P-H)\frac{A-P}{K}-S-O$$

Hence it is seen that the length of piston stroke S is a function of the pressures P-C and P-H and that the above formulae mathematically expresses the relationship for any given spring rate, initial spring compression, and piston means area.

It is seen that the present invention provides a novel fluid translating apparatus wherein the stroke of the fluid translating piston means is variable responsive to variations in the resultant of fluid forces and a constantly urging spring force acting on the piston. Moreover, the resultant which effects variations in piston stroke is not subjected to centrifugal forces which, if present, would impose an undesirable variable that would change in magnitude with variations in r.p.m. In addition, the present apparatus includes novel valve apparatus and sealing means which afford compactness, efficiency and economy of fabrication and assembly. The present apparatus is also very versatile in that it is readily adaptable to controlled operations of various types and can therefore be utilized to fill various fluid translating requirements.

One of the preferred forms of systems of a control is that shown in FIG. 21. In this aspect of the invention a pressure responsive valve 126 is connected to the high pressure side of the system, that is, to conduit 83 by a conduit 128. This valve includes a valve body 130 having an inlet port 132 and an annular outlet port 134, and includes a piston valve 136 which is arranged to open and close the valve port 134 in response to the pressure within the chamber 138 thereof. The chamber 140 on the opposite side of the valve 136, indicated at 140, contains a spring 142. This chamber 140 is connected by a port 144 and a conduit 146 to drain 148. The annular port 134 is connected by a conduit 150 through an inlet port 152 to the eccentric chamber 42. As seen from FIG. 1, this port 152 is connected to the interior of the cylinder block, that is, to the chamber 42 about the bearings 48. A restrictor 154 is interposed in this conduit 150. A conduit 156 is connected to conduit 150 and to drain 148, there being a restrictor 158 in this conduit 156.

The spring 142 of the valve 126 is adjusted to a desired predetermined value and normally causes the piston valve 136 to close port 134. However, when the pressure in the high side 83 and conduit 128 and chamber 138 attain a predetermined value, determined by the adjustment of spring 142, the piston valve 136 will uncover port 134 to connect the high side of the system to the eccentric chamber 42 through the conduit 150, the restrictor 158 in the conduit 156 impedes the flow of fluid to the tank 148 whereby a pressure is attained in the conduit 150 and the eccentric chamber 42. Obviously as the pressure in the high side attempts to increase, the pressure within the eccentric chamber 42 will increase, and such increased pressure in the eccentric chamber 42 will force the pistons 45 inwardly to thereby shorten the stroke of the pistons, resulting in less fluid being pumped. The restrictor 154 in the conduit 150 is utilized to impede the flow of fluid to such an extent as to substantially dampen out any pulsations in the flow of fluid which pulsations are caused by the intermittent operation of the pistons.

The control of the system by the valve 126 can be augmented by the valve 160. This valve includes an outer cylindrical casing 162 containing a spool type valve 164 having lands 166 and 168. The space 170 between the lands is adapted to register with an annular port 172 which is connected by conduit 174 with the high pressure line 80. The casing 162 is also provided with a second annular port 176 which is adapted to be closed by the land 168 of the spool 164. This port 176 is connected by conduit 178 to the conduit 150 and is therefore connected through the restrictor 154 to the eccentric chamber 42. One side of the spool 164 and an end wall of the casing 162 form a chamber 180 having a port 181 which port is connected by conduit 182 to the conduit 174 and is therefore connected to the high pressure line 83. The other side of the spool and the offset and wall of the casing 162 form a chamber 184 having a port 185 which port is connected by conduit 186 to a conduit 188. This conduit 188 is connected to the load. A restrictor 190 is interposed between line 83 and conduit 188. A spring 192 is disposed in chamber 184 and normally resists movement of the valve 164 to the right as viewed in FIG. 21 and normally maintains the land 168 closed upon port 176.

Restrictor 190 normally maintains a pressure differential between line 83 and line 188. Should this differential increase for any reason, as for example by an increase in speed of the prime mover or a lessening of the resistance offered by the load, the spool 164 will be moved to the right to partly open port 176 to space 170 and port 172 whereby fluid will flow from line 83 through conduit 174, port 172, spool space 170, port 176, conduits 178 and 150 to the eccentric chamber 42, thus increasing the pressure within eccentric chamber 42 to thereby shorten the strokes of the pistons.

Under certain conditions, as for example when the apparatus is called upon merely for the purpose of maintaining a desired constant pressure, the valve 126 would suffice. Also under certain conditions, as for example when the load demand is permanent and constant, valve 160 need only be employed. Where, however, the load demand varies and the speed of the shaft 46 varies, it is desirable to utilize both valves 126 and 160 to satisfy accurately the demands placed upon the system.

The use of valve 126 independently of valve 160 is shown in FIG. 20. It should be pointed out here that the casing 130 also functions as an accumulator if the piston 136 and casing 130 are arranged so that there is sufficient travel of the piston before it uncovers the port 134. In this respect the spring 142 is compressed upon increase in pressure in the line 83. If there is a sudden drop in pressure in the line 80, the spring can expand and the piston can deliver oil to the line and thus function for a moment as a pump on the line. Also, in reverse, it can act to absorb a very sudden surge of flow with a moderate pressure rise. In this latter event, it is directly a spring loaded accumulator.

The essential feature of the use of the combination of valve 160 with valve 126 is that the differential in pressure on opposite sides of the restrictor 190, determines what the outlet flow rate from the pump will be, regardless of the system pressure, within limits. The pressure piston 136 is normally closed until the pressure reaches the setting of this particular valve. If the pressure remains below the setting of the spring 142, then the flow control section, including valve 160, will have complete control of the pump as a function of the flow through the restrictor 190. When the system pressure rises to the preset pressure of spring 142 of valve 126 then the bypass flow will become a function of pressure and will take the control of the system away from the flow control section including valve 160. In this respect we have two governors working in conjunction on the pump, one regulating the flow within pressure limits and the other regulating the pressure within its flow limits. By changing the value of the restrictor 190 increasing or decreasing this restriction any flow rate from the pump mechanism that is required can be selected, since the spool 164 will follow this restriction and maintain the pump in exact correlation with what is required.

The restrictors, herein mentioned, may be of any type which offers restriction to the flow of fluid, such as an elongated passage of small cross sectional area or as is shown in FIG. 25. The valve 160 is more clearly shown in FIG. 25 wherein the restrictor is incorporated in the valve. The restrictor 190 in this embodiment includes an adjustable needle valve 194 which is threaded into one end of the casing 162 and restricts the flow through an orifice 196 which connects chamber 180 with chamber 200. Chamber 180 is connected to line 83, and chamber 200 is connected to line 183. The compression value of spring 192 can be varied by turning the cap 202.

Referring now to FIG. 22 which shows another aspect of controlling the system, there the pressure controller 126 is again employed and functions as explained with respect to FIGS. 20 and 21. In this system I employ a second valve including an outer casing 206 and having a cylindrical cavity 208 for slideably receiving a spool 210. As viewed in FIG. 22 the spool 210 divides the cavity 208 into three chambers, namely upper chamber 212, spool chamber 214 and lower chamber 216. The lower chamber is connected through a port 218 and by conduits 220 and 128 to the high pressure line 83. The upper chamber 212 is connected through a port 222, conduit 224, restrictor 226, and conduits 228, 220 and 128 to the high pressure line 83. An accumulator 230 is connected to the upper chamber 212 by conduits 232 and 224. The spool is provided with lands 234 and 236. Normally the annular spool space 214 registers with an annular port 238 in the casing 206 and this port is connected by conduit 240 to the inlet port 152 of the eccentric chamber 42. The casing 206 is also provided with a second annular port 242 which is normally closed by the land 236 of the spool.

A spring 244, located in chamber 216, normally maintains the spool in the position shown, namely with spool space 214 registering with port 238 and port 242 closed by land 236. However, if there is a sudden decrease in pressure in the line 83, this pressure will be reflected quicker in chamber 216 than in chamber 212 because of the restriction 226 in the conduit's chamber 212 with the high pressure side of the line, whereas the conduit 220 does not have such restrictor. This sudden decrease in pressure will cause a pressure differential in chambers 216 and 212, with the result of a quick downward movement of the spool 210 to cause the spool space 214 to bridge not only port 238 but also port 242 which connects the eccentric 42 to a source of low pressure, namely to drain through block port 152, conduit 240, port 238, spool space 214, port 242 and conduit 246 to drain 148. The sudden release of pressure within the chamber 42 permits the pistons to move readily inwardly to their fullest extent and therefore provide for the maximum stroke length of the pistons resulting in increased output of the pump. In addition to this the chamber 216 functions as an accumulator, the fluid content thereof being discharged into the high pressure side of the system through the port 218, conduits 220 and 128. The accumulator 230 functions to maintain the spool 210 in its lower position against the counter action of the spring 244 until the pressure recedes to an extent where it is over-balanced by the combined pressure in the line 83 and the spring 244. When the pressure in the high pressure line attains that desired, the pressure in chamber 216 including that of the spring 244 will again move the spool 210 to the position shown, disconnecting the circuit from eccentric chamber 42 to drain. The system is then, under normal conditions, controlled by the valve 126.

In the system shown in FIG. 23, I not only employ valves 126, 160 and 204, for the purposes heretofore described, but I also employ another valve 248 which is similar in construction to valve 204. This valve 248 includes an outer cylindrical casing 250 having a cylindrical cavity 252 which slideably supports a spool 254. The spool 254 divides the casing cavity 252 into three chambers, namely the upper chamber 256, spool chamber 258 and lower chamber 260. The lower chamber 260 is connected through a port 262, conduit 264 and conduit 270 to high pressure line 83 and the upper chamber 256 is connected by a conduit 266, a restrictor 268 and conduit 270 to the high side 83. An accumulator 272 is connected to chamber 256 by conduit 274. A spring 276 normally maintains the spool 254 in position shown in which the annular spool space 258 registers with an annular port 278 in the casing 250. This annular port is connected to the high side line 83 through the conduit 270. A second annular port 280, disposed above port 278, is connected by a conduit 282 to drain 148. In the event of a sudden undesirable increase in pressure in the high side 83, a differential in pressure will be created in chambers 260 and 256 due to the unrestricted passage 264, leading to chamber 260 and the restricted passage, through restrictor 268 leading to chamber 256. This results in the instant movement of the spool 254 upwardly whereby the land 284, on spool 254, will be moved away from registry with the port 280 and the spool space 250 will connect port 278 with port 280. The fluid from the high pressure side can then drain to drain through line 83, port 278, spool space 258, port 280 and conduit 282 to drain. Inasmuch as some fluid is stored under pressure in accumulator 272, the spool 254 will be moved downwardly so that the land 284 closes port 280 after excessive pressure on the high pressure side has been relieved.

Thus it is apparent that in the system shown in FIG. 23, I not only provide for the normal control through the pressure responsive valve 126 and the flow control valve 160 but I also provide, through valve 204, for compensating for a sudden decrease in pressure in the high pressure side of the system, and through valve 248 compensating for a sudden increase in pressure in the high pressure side of the system.

Referring now to FIG. 24 wherein another aspect of the invention is shown, I employ the valves 126 and 160 and connect the same in the system as shown in FIG. 21. In addition to these two control valves, I employ a second flow control valve 286 which is connected in parallel with the restrictor 190. This parallel line includes a restrictor 288. The valve 286 includes an outer casing 290. A spool 292 is reciprocally mounted within the casing 290 and divides the casing into three chambers, namely the upper chamber 294, the spool chamber 296 and the lower chamber 298. A spring 300 normally tends to hold the spool in the position shown in which the inlet port 302 and an outlet port 304 register with the spool space 296. The inlet port 302 is connected by a conduit 306 with the main high pressure line 83 intermediate the pump and the restrictor 190. The outlet port 304 is connected by conduit 308 to restrictor 288 and restrictor 288 is connected by conduit 310 to the conduit 188, that is, between the restrictor 190 and the load. The upper chamber 294 is connected by port 314 with a conduit 312 and the other end of the conduit 312 is connected to the conduit 308 by spool chamber 296 and port 304.

Normally, the valve is open, that is, spool space 296 registers with ports 302 and 304 whereby restrictor 288 is connected in parallel circuit relation with restrictor 190, the pressure in chamber 294 balancing the tension of spring 300. In the event of a sudden increase in pressure from the pump and of course the high side 83, the spool 292 will be forced downwardly (leftwardly) whereby the land 316 will block the passage 304, due to the concomitant increase in pressure in chamber 294. This in effect will close the parallel circuit or restrict the flow thereto including the restrictor 288. This has the effect of forcing the complete output of the pump into the primary control restrictor 190. When this condition is reached, the valve 126 assumes control by reason of the piston 136 opening the port 134 whereby the pressure within the eccentric chamber 42 is increased to shorten the strokes of the pistons.

The essential feature of the normally open spool valve 286 is to enable high flow of fluid at low pressure to the work but still not require the horsepower necessary to develop the high flow. This in a sense provides high and low circuits, which is similar to the deletion of one of a plurality of pumps and economizes on horsepower to a great degree. As an example, the plot of flow against pressure shows that four gallons per minute exist up to 200 p.s.i., and then is immediately cut back to one gallon per minute which continues up to 2000 p.s.i. A horsepower plot versus pressure shows that the horsepower begins to increase at four gallons per minute up to 200 p.s.i. and then there is an immediate cutback to one gallon at 200 p.s.i., whereupon there is then a continued or longer increase in horsepower buildup until one gallon per minute at 2000 p.s.i. is reached. Without the normally open spool, in order to obtain 2000 p.s.i., substantially the full displacement of the pump would be called upon before valve 126 would be brought into play. By the use of the valve 286, the valve 126 can be brought into play at any desired setting by the adjustment of the tension of spring 300.

In practicing the present invention, any type of pump may be employed in which the length of the strokes of the pistons can be varied by the pressure in a chamber to which the heads of the pistons are subjected. Another example of such pump is that of the swash plate type as shown in FIGS. 5, 6 and 7. In this embodiment of the invention the pump 318 comprises a casing 320 formed by a centrally disposed piston block 322 and end blocks 324 and 326 which are suitably secured to one another as by bolts 328, there being provided circular grooves 330 and sealing rings 332 at the junction of these elements. The blocks 322 and 326 are centrally bored as at 334 to provide for receiving a shaft 336. This shaft is journaled in roller bearings 338 carried by the block 322 and by ball bearings 340 carried by the block 326. The shaft is sealed by a packing gland 342 carried by an end plate 344 which is also held in position between bolts 328 and is provided with circular grooves and sealing rings 330 and 332 respectively. The shaft 336 extends into a chamber 346 formed by the block 324 and an end of the block 322. This end of the shaft carries a swash plate 348, the outer end of which abuts a thrust bearing 350. This thrust bearing abuts the inner side 352 of the end wall 354 of the block 324. This wall 354 is drilled at 356 and threaded to receive a coupling as at 152. The central portion of the thrust bearing 350 is hollow and the swash plate 348 is drilled as at 349 parallel to the shaft 336 whereby fluid can readily flow from port 152 into the interior of chamber 346. Coupling 152 is connected with conduit 150 and the pressure within the chamber 346 is therefore controlled either by valve 126 or valve 160 or the combination of both. Thus it will be seen that the pressure within chamber 346 is adapted to be varied in the same manner as the pressure within chamber 42 of the radial type piston pump 28.

A series of cylinders 358 is formed in the cylinder block 322. Any suitable number may be employed and is herein shown as including six. These cylinders are formed parallel to the shaft 336 and are spaced about the parallel opening 334. Each of these cylinders contains a piston 360 and of course these pistons are reciprocally mounted in their respective cylinders. Each of the cylinders contains a spring 362 and these springs normally urge the pistons to the left as viewed in FIG. 5, so that the heads 364 are normally in engagement with the inclined surface 366 of the swash plate 348.

The right end wall of block 324 is provided with a circular groove 368 which forms an outlet manifold for outlet passages 370. Six of these outlet passages 370 are provided, one for each cylinder, and each of the cylinders is provided with an outlet port 372 which is controlled by a ball valve 374 which is normally urged upon its seat 376 by a spring 378. Access may be had to these valves 374 through openings 380 which are normally closed by a plug 382. Outlet manifold 368 is connected by a conduit 384 to the high pressure side 83 of the system. The end of this opening is threaded as at 386 for receiving a coupling.

The left end of block 326 is provided with a circular recess 388 which receives two rings 390 and 392. The ring 392 provides six inlet valve seats 394 and is provided with a circular inlet manifold 396 connected with each of the openings 398 therein adjacent the seats 394. The ring 390 is provided with openings 400. These openings 400 and the openings 398 and the seats 394 are aligned with the cylinders. The seats receive ball valves 402 and these valves are normally held in position by springs 404. The manifold 396 is connected by an inlet conduit 406. The outer end of this conduit is threaded for receiving a coupling connected to the low pressure side of the system.

As the pistons are moved to the left, during the rotation of the swash plate 348, by the springs 362, the inlet valve balls 402 will be lifted from their respective seats to permit the flow of fluid into the cylinders 358, and when the pistons are moved to the right by the swash plate 348, the ball valves 402 will close and the fluid will be forced through the ports 372, lifting the valves 374 from their seats, whence the fluid will flow through passages 370, manifold 368 and passage 384 to the high pressure side 83 of the system. As was explained with respect to the pressure changes in chamber 42, in connection with the radial type pump 28, increase in pressure above a predetermined value in driving mechanism chamber 346 will force the pistons 360 to the right whereby they will only be engaged by the surface 366 of the swash plate 348 during part of the possible piston moving characteristic of the swash plate. Thus the length of the piston stroke will be decreased and increased proportionately to the increase and decrease of pressure in the driving mechanism chamber 346.

Referring now to the embodiment shown in FIGS. 8 and 9, the pump 408 is of the radial piston type similar to that shown in FIGS. 1 and 2. It includes the casing formed by a cylinder block 412, an end block 414 and an oppositely disposed end block 416. These blocks are suitably secured to one another as by bolts not shown and are suitably sealed at their junctions by providing sealing rings 332 compressed within circular grooves 330. The cylinder block 412 is provided with a centrally disposed eccentric chamber 42 and is provided with six radially disposed cylinders 40 which receive the pistons 45. The shaft 46 is journaled in bearings 47 and 48 disposed respectively in blocks 416 and 414. The shaft is provided with the eccentric 50 which is disposed in chamber 42. A ring 418 is journaled on the eccentric 50 by roller bearings 52. Rotation of the shaft 46 will cause rotation of the eccentric 50 and the consequent reciprocation of the pistons 45 through the eccentric ring 418.

The casing 410 is carried by a base 420 having an upright 422 and the block 416 is secured to the upright 422 by bolts 424.

The inlet to the pump is through the threaded opening 71 in block 416 and this opening 71 is connected to a circular manifold 72. Six ports 73 connect with the manifold 72 in the end thereof and form seats 74 for inlet ball valve 77. These inlet balls are normally held upon their seats by the springs 81. In this embodiment of the invention, the port 73 is formed in a hollow plug 426, the left end of which provides the valve seat 74 and this plug is threaded into threaded holes 428 in the right side wall of block 412. The plug carries a valve cage 430 each comprising a head which carries a stop pin 432 and side wires 434. The stop limits the extent of opening movement of the valve 77.

The six cages 430 are contained in six openings 436 in block 412 which form a continuation of the opening 428 and each of these is provided with an individual passage 438 which is connected respectively with one of the cylinders 40. Thus on the inward stroke of the piston by the action of the springs 62, fluid will flow from the inlet 71, manifold 72, passages 73, openings 436 and passages 438 to the cylinders.

The openings 436 merge into aligned outlet passages 86 and then are enlarged to form valve seats 87 for ball valves 89 and outlet passages 80. These passages lead to a manifold 82. Outlet manifold 82 is connected with an outlet 83 which is the high pressure side of the system. Springs 91 normally urge the valves 89 upon their seats. These springs are disposed intermediate the ball valves 89 and a wall of the manifold 82. Pins 440 form stops for limiting the outward movement of the valves 89 and these pins are pressfit into the block 414. Obviously when the piston is moved outwardly by the eccentric, the fluid is forced through the passages 86, by valves 89, passages 80, manifold 82 and outlet 83 to the high pressure side of the system.

Under certain conditions, for example, under heavy load or high speed of pump operation, the resulting pressure at the line of contact between the circular eccentric ring and the head of the piston exceeds the strength of the metal and a breakdown of the metal surface would result, due to the impacts between the eccentric ring and the piston head when the pressure is such in the eccentric chamber as to hold the pistons outwardly out of contact with the eccentric ring during part of the eccentric movement of the ring. This is partly due to the fact that an oil film cannot be sustained at the line of conact. I have found that if the surfaces of the ring 418 were made to complement the surfaces of the head of the piston, the detrimental effect of line contact is eliminated and noise is materially minimized. To accomplish this the ring 418 is provided with six flat surfaces 442 which complement the flat surfaces on the head of the piston. In this way a cushioning effect is assured between the ring and the head of the piston. The cushioning phenomena results from oil viscous and the mass effects as oil is squeezed from between the two flat surfaces, namely the flat surfaces on the ring and the flat surfaces on the piston heads. It has been found in actual practice that the oil used in a hydraulic system such as oil having a viscosity of 235 SSU at 100 degrees F. is such that, for example, at a speed as low as 500 r.p.m. of the shaft 46 all of the oil is not squeezed out from between the flat surface 442 of the ring and the head of the piston, and in fact there is no metal to metal contact between these two flat surfaces but a cushion of oil always is maintained. This phenomena is shown in FIGS. 10, 11 and 12 wherein FIG. 10 shows the eccentric ring surface 442 spaced to greatest distance from the head of the piston 45, and FIG. 12 shows the extreme upper position of the surface 442, and it will be noted that a film of oil is maintained between this surface 442 and the head of the piston.

In order to maintain the phenomenal characteristics of the complementing bearing surfaces, certain restrictions are imposed upon the pump so that the complementing surfaces are maintained parallel at all times, and in the instant illustration, the surfaces 442 must be maintained parallel with the outer surface of the head of the piston. In other words, the outer bearing race or ring 418 must be stabilized in spaced position, square to the pistons at all times, while the rotation of the pump is taking place. It is obvious that if such pressure is maintained in the eccentric chamber 42 that the piston return, by the spring, is limited to an extreme point in which the ring barely touches the piston head, the ring is apt to move out of alignment, that is, the bearing surfaces 442 thereof will no longer be maintained parallel with the outer surface of the piston head. Therefore in such structure as that shown in FIGS. 8 and 9, the pressure within chamber 442 should not be increased to an extent in which the pistons are maintained radially extended beyond a point in which at least one of the heads of the piston must at all times have sufficient area in relationship with the ring so as to prevent rotation of the ring; i.e., that at no time should all of the heads of the pistons be separated from the ring, but at least one piston should succeed the next adjacent in holding the ring against rotation.

To assure the non-rotation of the ring 418, that is, to assure that the surfaces 442 of the ring are maintained parallelly with the complementing surface of the heads of the piston, I provide a "dynamic key." In this connection attention is specifically directed to the embodiments shown in FIGS. 13 to 19 including the controls therefor. It will be observed from FIG. 13 that it is the same as FIG. 8 except the view is taken from the opposite direction and one of the inlets 73 is closed by a solid plug 444, and one of the outlets 86 is closed by a solid plug 446. It will also be observed from FIG. 14, which is similar to FIG. 9, that a cylindrical element 445 is substituted for a piston 45. The head of this element is provided with a plurality of openings 448. Thus with these openings 448 and by reason of the plugs 444 and 446, the element or "dynamic key" 445 merely reciprocates with a body of fluid, herein oil, without doing any pumping action, that is, as the key 445 moves radially outwardly, the oil displaced flows readily through the passages 448 and as the key moves inwardly under the tension of the spring 62, oil readily flows inwardly into the cylinder through the passages 448. The pressure within the chamber 42 has no effect whatsoever upon the head of the key since the pressure is balanced on opposite sides of the key. Thus the key 445 functions as a "dynamic key" and it is constantly held in engagement with its complementing surface 442 on the ring 418.

In the embodiment shown in FIG. 15 the "dynamic key" 45a functions as a piston. In this embodiment plug 444 is not used but a valve 77 controls the flow of fluid to the passage 438; however, outlet plug 446 is employed for closing the outlet port leading to the outlet manifold 82. A separate outlet valve 450 is provided for this embodiment and it includes a casing 452 which is threaded as at 454 into the cylinder block 412 in alignment with the cylinder 40 containing the "dynamic key" 45a. This casing 45 has an outlet 456 in alignment with the cylinder 40 and the casing is also counterbored as at 458 to provide a seat 460 for a ball valve 462. A spring 464 normally urges the valve 462 on to its seat. This spring is set between the ball 462 and a plug 466. This plug has openings 468 therethrough for permitting the flow of fluid to opposite sides thereof. The outer end of this plug is threaded as at 470 for receiving a coupling which may be connected to a high pressure line.

The spring 62a in this embodiment is under sufficient compression to counteract any of the normally high pressure prevailing in the eccentric chamber 42. That is, the spring 62a maintains the head of the key 45a in contact with the surface 442 of the ring 418 at all times regardless of the pressure within chamber 42, except for the oil film between said surface 442 and the head of the piston.

In the embodiment shown in FIGS. 16 and 17 the valve 450 is again employed and functions as an outlet valve as explained with respect to FIG. 15. In this embodiment however, the piston constitutes preferably a solid cylindrical key 45b which key is tied to an eccentrically driven ring 418b. Therefore as the piston reciprocates it will effect the pumping operation in a manner as described with respect to FIG. 15. The tie between the head of the piston or "dynamic key" 45b and the eccentrically driven ring 418b is such that the key can move only in a radial direction, both inwardly and outwardly. As will be seen more clearly from FIG. 17 the head of the piston is flat and complements the flat surface 442b of the ring 418b and opposite edges at the extreme inner end of the head are provided with ledges, and these ledges are received by slots 474 in the ring. That is, portions 476 on opposite sides of the ring overlie the ledges 472. In this manner the ring 418b can reciprocate, transversely of the axis of the piston with respect to the key 45b but ties the key to the ring so that the key 45b will be positively reciprocated during the eccentric movement of the ring.

In FIG. 18 I have shown a control system in which the "dynamic key" 445 is employed and here by reference numeral 478 I have shown diagrammatically either a control 126 or control 160 or a combination of both. In this embodiment the key 445 is constantly in effect and performs no pumping action.

In the embodiment shown in FIG. 19, I utilize one of the standard pistons 45 and standard spring 62 as the "dynamic key." Here again the feedback valve 478 can be a control 126 or control 160 or a combination of both. In this embodiment of the invention I employ a control valve 480 including a casing 482 which is provided with a cylinder 484. This cylinder is divided into three chambers by a spool 486, namely the left chamber 488, spool chamber 490 and the right chamber 492. This casing 482 is provided with two ports 494 and 496. Port 494 is normally closed by the land 498 of the spool while port 496 is normally open to the spool chamber 490.

A conduit 500 is connected to the intake passage 438 for that cylinder which receives the "dynamic key" 45c. The other end of this conduit is connected to the port 494. A conduit 502 has one end connected to a port 504 leading to and from the eccentric chamber 42. The other end of conduit 502 is connected to port 496 of the valve casing 482. Now if the spool is moved to the left so that spool chamber 490 registers both with ports 494 and 496, then the eccentric chamber 42 is immediately connected directly with the intake passage 438. A spring 506 normally tends to hold the spool 486 in the position shown against the head of the pressure in chamber 492. Chamber 492 is connected by port 508 and conduits 510 and 502 and port 504 to the interior of the eccentric chamber 42 and therefore the pressure therein varies with the variation in pressure in the chamber 42. The eccentric chamber 42 is connected through the orifice 154 and port 152 in the usual manner as heretofore described. Thus it is apparent that as the pressure in the eccentric chamber rises to a predetermined value in which the pressure in chamber 492 of valve 480 overcomes the compression of spring 506 and opens port 496 to port 494, through spool chamber 490, the pressure will be the same on opposite sides of the "dynamic key" 45c. It will be understood that the showing in FIG. 19 is merely diagrammatic, but it is to be understood that the valve 480 is sufficiently close to the reciprocating piston or key 45c so that the conduits 500 and 502 offer only a small amount of resistance and therefore the pressure on opposite sides of the piston 45c is substantially the same when port 496 is connected with port 494. Thus the piston merely floats and does not function as a pump, and the spring 62 holds the head of the piston in constant engagement with the flat surface of the ring 418 so that the piston 45c merely functions then as a "dynamic key" to hold the ring from rotation while the other pistons 45 have their heads spaced at times from the respective surfaces 442 of the ring.

While the structural views of FIGS. 9–17 do not show any of the pumping pistons lifted off the complementary surfaces of the eccentric driving ring 418, the diagrammatic views of FIGS. 18–24 illustrate the pistons in lifted positions for shortened strokes. It should be understood that the latter views are merely diagrammatic and in fact all lifted pistons will project substantially equal distances into the eccentric chamber.

In all valves, each of the opposite chambers is provided with a port for the escape of oil so as to provide for free movement of the spool when necessary, and in such chambers, such as 140 of FIG. 21 or 488 of FIG. 19 wherein it is desired that no oil be present, I provide outlet ports 144 which connect the chamber through conduit 146 to drain 148.

Referring again to FIGS. 8, 9, 13 and 14, the cylindrical shell 32 surrounds the cylinder block 412 and functions as explained in connection with FIGS. 1 and 2. The packing gland 342 includes, as it does in FIG. 5, an oil seal shaft collar 343, which is held in place in any suitable manner as by a thrust retaining collar 345. This collar is secured to the shaft 46 by a set screw 347. The chamber 349, containing the packing gland 342, is connected to the high pressure side of the pump through a passage 415. A thrust washer 417 surrounds shaft 46 and is in abutting relationship with a wall 419, formed by a recess 421 in block 416, and in abutting relationship with a shoulder 423 on shaft 46. The eccentric chamber 42 may be drained after the drain plug 425 is removed.

It is to be understood that the compression force of all springs of all value may be adjusted as the valve spring is adjusted in FIG. 25.

While the forms of embodiments herein shown and described constitute preferred forms, it is to be understood that other forms may be adopted falling within the scope of the claims that follow.

I claim:

1. A fluid translating apparatus, comprising, a cylinder block having a plurality of radially arranged cylinders therein having inner ends opening into a central drive chamber and outer ends providing pump chambers, a plurality of pump pistons reciprocable respectively in the cylinders and having inner ends projectable into the central chamber, valve means for admitting and exhausting fluid to and from the pump chambers, means for pressing the pistons inwardly through intake strokes, a drive shaft in said central drive chamber having an eccentric thereon aligned with the pistons, a bearing ring rotatable on the eccentric and having a plurality of separate outer surfaces engageable respectively by the inner ends of said pistons for driving the latter outwardly through pumping strokes, each of said separate outer surfaces having a predetermined shape and the associated piston end having a complementary end surface engageable therewith, both surfaces extending in a direction transverse to the piston axis of reciprocation, means in fluid communication with the central drive chamber for conducting control fluid thereto, and means connected to the last recited means for varying the pressure in the drive chamber gradually relative to the intake pressure in the pump chambers to vary the piston intake strokes gradually between a maximum stroke permitted by said eccentric and ring and a lesser minimum stroke as determined by said relative pressures.

2. A fluid translating apparatus as defined in claim 1 wherein said separate outer surfaces on said ring and the complementary piston end surfaces are flat and lie respectively in planes normal to the axes of piston reciprocation, so that the fluid in said central drive chamber between such surfaces when separated functions to cushion the impact of ring surface to piston end surface and to pre-accelerate the pistons prior to final impact with the ring.

3. A fluid translating apparatus as defined in claim 1 including a pump outlet communicating with said exhaust valve means, an outlet conduit connected to the outlet and adapted for connection with a load, and means in fluid communication with said outlet conduit and said drive chamber constantly responsive to pressure in the outlet conduit for gradually varying the pressure in the drive chamber proportionately with pressure changes in the outlet conduit, thereby to gradually vary the piston strokes inversely with pressure changes in the outlet conduit and maintain a constant outlet pressure on variations in the speed of the drive shaft or variations in the resistance of a load.

4. A fluid translating apparatus as defined in claim 1 including a pump outlet communicating with said exhaust valve means, and wherein the means for controlling the pressure in said central drive chamber comprises: a conduit connected with the pump outlet and leading to drain, a pressure reducing valve in said conduit, a second conduit connected to the first conduit downstream from said pressure reducing valve and communicating with said central chamber, and means in said first recited conduit downstream from the second recited conduit for maintaining a back pressure in both conduits, thereby to vary the chamber pressure in proportion to pressure variations at the pump outlet.

5. A fluid translating apparatus as defined in claim 1 including a pump outlet communicating with said exhaust valve means, and wherein the means for controlling the pressure in said central drive chamber comprises, a conduit leading from said pump outlet to drain, a valve in said conduit including a movable valve member, spring means normally biasing the valve member to a closed position blocking flow through said conduit, a passage connecting the pump outlet and the valve for movement of the valve member by fluid in the pump outlet to open positions proportional to outlet pressure, a restrictive orifice in said conduit downstream from said valve for maintaining a back pressure, a second conduit leading from the first conduit between said valve and orifice and connected to said central drive chamber, and a restrictive orifice in said second conduit to dampen pulsations in fluid flow from the pump outlet to said drive chamber.

6. A fluid translating apparatus as defined in claim 1 including a pump outlet communicating with said exhaust valve means, and an outlet conduit leading from said outlet for connection with a load device, and wherein said means for controlling the pressure in said central drive chamber comprises, a restrictive orifice in said outlet conduit and means in fluid communication with the drive chamber and responsive to the pressure drop across the orifice for varying the pressure in said drive chamber in proportion to said pressure drop.

7. A fluid translating apparatus as defined in claim 1 including a pump outlet communicating with said exhaust valve means, and an outlet conduit leading from the outlet for connection with a load device, and wherein the means for controlling pressure in said central chamber comprises: a restrictive orifice in said outlet conduit, valve means in fluid communication with the central drive chamber and responsive to the pressure differential across said orifice for varying the pressure in said central chamber in proportion to changes in the pressure drop across the orifice, and valve means in fluid communication with the central drive chamber and responsive to pressure in the outlet conduit for varying the pressure in said chamber in proportion to pressure changes in the outlet conduit.

8. A fluid translating apparatus, as defined in claim 1 including means engageable with the bearing ring for preventing rotation thereof when all said piston ends are lifted off said complementary surfaces on the ring.

9. A fluid translating apparatus, as defined in claim 8 wherein the means preventing rotation of said ring comprises: an additional cylinder in said cylinder block, a piston reciprocable therein, complementary engageable surfaces on the piston and the ring for preventing rotation of the latter, and means for constantly maintaining the ring retaining piston in engagement with its complementary surface on said ring.

10. A fluid translating apparatus as defined in claim 9, wherein the means for maintaining the ring retaining piston in engagement with the ring includes interlocking surfaces on the piston and the ring.

11. A fluid translating apparatus as defined in claim 9, wherein the means for maintaining the ring retaining piston in engagement with the ring comprises a spring constantly biasing the piston toward the ring.

12. A fluid translating apparatus as defined in claim 11 including springs of equal strength respectively biasing all said pistons toward said ring, and passage means means connecting opposite ends of said ring retaining piston to said central drive chamber so that the ring retaining piston floats under control of its spring and said ring.

13. A fluid translating apparatus as defined in claim 11 including springs of equal strength respectively urging said pump pistons toward said ring, an outlet manifold communicating with the exhaust valve means of each of said pump pistons, the spring urging said ring retaining piston having a strength substantially greater than the strength of the individual springs urging the pump pistons to prevent separation of the ring retaining piston and the ring, intake and exhaust valves communicating with the outer end of the cylinder housing said ring retaining piston, and a separate outlet conduit communicating with the last recited exhaust valve, whereby the ring retaining piston provides a constant displacement single piston pump, and said pump pistons provide a variable displacement multiple piston pump.

14. A fluid translating apparatus as defined in claim 11, including springs of equal strength respectively urging all said pistons toward said ring, intake and exhaust valves communicating with the outer end of the cylinder housing said ring retaining piston, an outlet manifold connecting all said exhaust valves, passage means connecting opposite ends of said ring retaining piston to said central drive chamber, valve means normally blocking flow through said passage means so that said ring retaining piston normally functions as a pumping piston, said valve means being responsive to pressure in said central drive chamber to connect opposite ends of said ring retaining piston to said central drive chamber in response to a predetermined pressure increase in the central chamber so that the ring retaining piston is maintained in floating engagement with the ring.

15. A fluid translating apparatus, comprising, a pump housing, a cylinder block having a plurality of cylinders each opening at one end into a common drive chamber in the housing and having an opposite end providing a pump chamber, a plurality of pump pistons reciprocable respectively in the cylinders, each piston having one end projecting into said drive chamber, valve means for admitting and exhausting fluid to and from the pump chambers on reciprocation of the pistons, means for pressing the pistons toward said drive chamber through intake strokes, drive means including a cam in the drive chamber engageable with the piston ends and means for relatively rotating the cam and cylinder block to drive the pistons through pumping strokes on relative rotation of the cam and block, an outlet communicating with said exhaust valve means, and means for varying the piston strokes in response to outlet pressure to maintain a constant outlet pressure on variations in the speed of the drive means or variations in load, comprising, a conduit connected with the outlet to drain fluid therefrom for control purposes, a pressure reducing valve in said conduit, means in said conduit downstream from said pressure reducing valve for maintaining a back pressure, and a second conduit leading from the first conduit between said pressure reducing valve and said back pressure means and communicating with said drive chamber to vary the pressure therein thereby to regulate the piston strokes.

16. A fluid translating apparatus as defined in claim 15 including an outlet conduit leading from said outlet and means for compensating for sudden pressure decreases in said outlet conduit, comprising, a conduit connected with said drive chamber and leading to drain, and valve means in said last recited conduit responsive to pressure in the outlet conduit for connecting the drive chamber to drain only in the event of sudden pressure decreases in the outlet conduit.

17. A fluid translating apparatus as defined in claim 15, including an outlet conduit leading from the outlet manifold, and means for compensating for sudden undesirable pressure decreases in said outlet conduit, comprising, a conduit connected with said drive chamber and leading to drain, a valve in said last recited conduit including a valve member movable between a closed position blocking flow through the conduit and an open position permitting flow through the conduit, a spring urging the valve member toward closed position, a first passage connected with the outlet conduit and with one end of the valve member so that outlet pressure acts in conjunction with said spring to urge the valve member toward closed position, a second passage connecting the outlet conduit to the opposite end to the chamber member, a restrictive orifice in the second passage, and an accumulator connected with the second passage between the orifice and the valve, whereby constant pressure or gradual pressure decreases in said outlet conduit maintain the valve member in closed position and whereby sudden pressure decreases enable movement of the valve member to open position thereby connecting the drive chamber to drain.

18. A fluid translating apparatus, comprising a pump housing having a plurality of cylinders each opening at one end into a common drive chamber and having an opposite end providing a pump chamber, a plurality of pump pistons reciprocable respectively in the cylinders, each piston having one end projecting into said drive chamber, valve means for admitting and exhausting fluid to and from the pump chambers on reciprocation of the pistons, means for pressing the pistons toward said drive chamber through intake strokes, drive means including a rotatable cam in the drive chamber engageable with the piston ends to drive the pistons through pumping strokes on rotation of the cam, an outlet communicating with said exhaust valve means, and means for varying the piston strokes to maintain a constant outlet pressure, comprising, a conduit leading from said outlet to drain, a valve in said conduit including a movable valve member and spring means normally biasing the valve member to a closed position blocking flow through said conduit, a passage connecting the outlet and the valve for movement of the valve member by fluid in the outlet to open positions proportional to outlet pressure, a restrictive orifice in said conduit downstream from said valve for maintaining a back pressure, and a second conduit leading from the first conduit between said valve and orifice and connected to said drive chamber.

19. A fluid translating apparatus as defined in claim 18, including a restrictive orifice in said second conduit to dampen pulsations in fluid flow from said outlet to said chamber.

20. A fluid translating apparatus as defined in claim 18 including an outlet conduit leading from said outlet, means for compensating for sudden pressure increases in the outlet conduit, comprising, a conduit connected to the outlet conduit and leading to drain, valve means in the last recited conduit responsive to pressure in the outlet conduit for connecting the same to drain only in the event of sudden pressure increases therein; and means for compensating for sudden pressure decreases in the outlet conduit, comprising, a conduit connected with said drive chamber and leading to drain, valve means in said last recited conduit responsive to pressure in the outlet conduit for connecting the drive chamber to drain only in the event of sudden pressure decreases in the outlet conduit.

21. A fluid translating apparatus, comprising, a pump housing, a cylinder block having a plurality of cylinders each opening at one end into a common drive chamber in the housing and having an opposite end providing a pump chamber, a plurality of pump pistons reciprocable respectively in the cylinders, each piston having one end projecting into said drive chamber, valve means for admitting and exhausting fluid to and from the pump chambers on reciprocation of the pistons, means for pressing the pistons toward said drive chamber through intake strokes, drive means including a cam in the drive chamber engageable with the piston ends and means for relatively rotating the cam and cylinder block to drive the pistons through pumping strokes on relative rotation of the cam and block, an outlet manifold communicating with said exhaust valve means, an outlet conduit leading from the outlet manifold for connection with a load device, and means for varying the piston strokes, comprising, a restrictive orifice in said outlet conduit, and means in fluid communication with the drive chamber for varying the pressure therein in response to and proportionately with the pressure drop across the orifice.

22. A fluid translating apparatus, comprising, a pump housing having a plurality of cylinders each opening at one end into a common drive chamber and having an opposite end providing a pump chamber, a plurality of pump pistons reciprocable respectively in the cylinders, each piston having one end projecting into said drive chamber, valve means for admitting and exhausting fluid to and from the pump chamber on reciprocation of the pistons, means for pressing the pistons toward said drive chamber through intake strokes, drive means including a rotatable cam in the drive chamber engageable with the piston ends to drive the pistons through pumping strokes on rotation of the cam, an outlet manifold communicating with said exhaust valve means, an outlet conduit leading from the outlet manifold for connection with a load device, and means for varying the piston strokes by lifting the pistons off the cam, comprising, valve means in fluid communication with the drive chamber and responsive to pressure in the outlet conduit for varying the pressure in said drive chamber in proportion to pressure changes in the outlet conduit, a restrictive orifice in said outlet conduit, and valve means in fluid communication with the drive chamber and responsive to the pressure drop across said orifice for varying the pressure in said drive chamber in proportion to changes in the pressure drop across the orifice.

23. A fluid translating apparatus as defined in claim 22 including means for compensating for sudden pressure decreases in said outlet conduit, comprising, a conduit connected with said drive chamber and leading to drain, valve means in said last recited conduit, means acting against one side of the valve means urging the same toward open position, and a passage placing the opposite side of the valve means in fluid communication with the outlet conduit so that pressure in the outlet conduit normally maintains the valve means closed but in the event of sudden pressure decreases in the outlet conduit allows the last recited means to open the valve means to connect the drive chamber to drain.

24. A fluid translating apparatus as defined in claim 22 including means for compensating for sudden pressure increases in the outlet conduit, comprising, a conduit connected to the outlet conduit and leading to drain, normally closed valve means in the last recited conduit responsive to pressure in the outlet conduit for connecting the same to drain only in the event of sudden pressure increases therein; and means for compensating for sudden pressure decreases in the outlet conduit, comprising, a conduit connected with said drive chamber and leading to drain, and normally closed valve means in said last recited conduit responsive to outlet pressure for connecting the drive chamber to drain only in the event of sudden pressure decreases in the outlet conduit.

25. A fluid translating apparatus, comprising, a cylinder block having a plurality of radially arranged cylinders therein having inner ends opening into a central drive chamber and outer ends providing pump chambers, a plurality of pump pistons reciprocable respectively in the cylinders, each piston having an inner end projectable into the central chamber and an outer end reciprocable in the cylinder, valve means for admitting and exhausting fluid to and from the pump chambers, spring means for moving the pistons inwardly through intake strokes, a drive shaft in said central drive chamber having an eccentric thereon aligned with the pistons, an outlet manifold communicating with each of said exhaust valve means, an outlet conduit leading from the manifold for connection to a load device, and means for controlling the piston strokes in response to pressure and flow conditions in the outlet conduit, comprising, a restrictive orifice in said outlet conduit, a second conduit leading from the outlet conduit upstream of said orifice and connected with drain, valve means in said second conduit including a valve member normally biased to a position blocking flow through said conduit, conduit means connecting opposite ends of said valve member to said outlet conduit on opposite sides of said orifice so that the valve member is positionable in response to the pressure drop across the orifice, a second restrictive orifice in said second conduit between the valve and exhaust for establishing a back pressure, and a third conduit connecting the central chamber and the second conduit between the valve and orifice, so that the piston strokes are shortened in response to increases in pressure drop across said first orifice, a fourth conduit leading from said outlet conduit to said second conduit between said valve and second orifice, a valve in said fourth conduit including a movable valve member and spring means normally biasing the valve member to a closed position blocking flow through said fourth conduit, a passage connecting the outlet conduit and the second valve for movement of the valve member by fluid in the outlet conduit to open positions proportional to outlet pressure.

26. A fluid translating apparatus for delivering a large volume, low pressure flow to a load or alternatively automatically a small volume high pressure flow to the load, comprising, a variable displacement pump having an outlet, an outlet conduit for connection with a load, a restrictive orifice in the outlet conduit, fluid means for varying the pump displacement, means in fluid communication with the displacement varying means for varying the pressure therein in response to the pressure drop across the orifice, a parallel conduit having opposite ends connected with said outlet conduit at opposite sides of the orifice therein, a restrictive orifice in said parallel conduit, valve means in said parallel conduit movable between a closed position blocking flow through the parallel conduit and an open position enabling flow through the parallel conduit, means biasing the valve means to an open position normally enabling a large volume low pressure flow to the load device, and conduit means connected to the outlet conduit ahead of the orifice therein and to said valve means to move the latter to closed position in response to pressure increases in the outlet conduit thereby to reduce the flow to a lesser volume.

27. A fluid translating apparatus for delivering a large volume, low pressure flow to the load or alternatively automatically a small volume high pressure flow to the load, comprising, a variable displacement pump having an outlet, an outlet conduit for connection with a load, a restrictive orifice in the outlet conduit, fluid means for varying the pump displacement, valve means in fluid communication with the outlet conduit ahead of the orifice therein and with the displacement varying means for varying the pressure therein in proportion to pressure changes in the outlet conduit, valve means in fluid communication with the displacement varying means for varying the pressure therein in response to the pressure drop across the orifice, a parallel conduit having opposite ends connected with said outlet conduit at opposite sides of the orifice therein, a restrictive orifice in said parallel conduit, valve means in said parallel conduit movable between a closed position blocking flow through the parallel conduit and an open position enabling flow through the parallel conduit, means biasing the valve means to an open position normally enabling a large volume low pressure flow to the load device, and conduit means connected to the outlet conduit ahead of the orifice therein and to said valve means to move the latter to closed position in response to pressure increase in the outlet conduit thereby to reduce the flow to a lesser volume.

28. A fluid translating apparatus for delivering a large volume low pressure flow to a load or alternatively automatically a small volume high pressure flow to the load, comprising, a pump having an outlet, an outlet conduit for connection with a load, a restrictive orifice in the outlet conduit, a parallel conduit having opposite ends connected with said outlet conduit at opposite sides of the orifice therein, a restrictive orifice in said parallel conduit, valve means in said parallel conduit movable between a closed position blocking flow through the conduit and an open position enabling flow through the conduit, means biasing the valve to an open position enabling a large volume low pressure flow normally to the load device, and conduit means connected to the outlet conduit ahead of the orifice therein and to said valve to move the latter to closed position in response to pressure increase in the outlet conduit thereby to reduce the flow to a lesser volume.

29. Means for decreasing fluid pressure in a system control chamber on sudden pressure decreases in the system load line, comprising, a conduit connectable to said control chamber and to drain, a valve in said conduit including a valve member movable between a closed position blocking flow through the conduit and an open position permitting flow through the conduit, a spring urging the valve member toward closed position, a first passage connectable with the load line and leading to one end of the valve member so that load line pressure acts in conjunction with said spring to urge the valve member toward closed position, a second passage connecting the load line to the opposite end of the valve member, a restrictive orifice in the second passage, and an accumulator connected with the second passage between the orifice and the valve.

30. In a fluid translating apparatus having pump means, an outlet conduit for conducting the pump output to a load device, and means for varying the pump displacement including a fluid chamber for receiving control fluid, in combination therewith: means for compensating for sudden pressure increases in the outlet conduit, comprising, a conduit connected to the outlet conduit and leading to drain, valve means in the last recited conduit responsive to pressure in the outlet conduit for connecting the same to drain only in the event of sudden pressure increases therein; and means for compensating for sudden pressure decreases in the outlet conduit, comprising, a conduit connected with said fluid chamber and leading to drain, valve means in said last recited conduit responsive to outlet pressure for connecting the fluid chamber to drain only in the event of sudden pressure decreases in the outlet conduit.

31. A fluid translating apparatus, comprising, a cylinder block having a plurality of radially arranged cylinders therein having inner ends opening into a central drive chamber and outer ends providing pump chambers, a plurality of pump pistons reciprocable respectively in the chambers and having inner ends projectable into the central chamber, valve means for admitting and exhausting fluid to and from the pump chambers, a pump outlet communicating with the exhaust valve means, spring means urging the pistons inwardly through intake strokes, a drive shaft in said central drive chamber having an eccentric thereon engageable by the inner ends of the pistons for driving the latter outwardly through pumping strokes, means in fluid communication with the central drive chamber for conducting control fluid thereto and valve means connected to the last recited means and responsive to a fluid condition in the pump outlet for gradually varying the pressure of control fluid in the drive chamber to gradually vary the piston intake strokes between a maximum stroke permitted by said eccentric and a lesser minimum stroke determined by said fluid condition.

32. A fluid translating apparatus, comprising, a cylinder block having a plurality of radially arranged cylinders therein having inner ends opening into a central drive chamber and outer ends providing pump chambers, a plurality of pump pistons reciprocable respectively in the cylinders and having inner ends projectable into the central chamber, valve means for admitting and exhausting fluid to and from the pump chambers, means for pressing the pistons inwardly through intake strokes, a drive shaft in said central drive chamber having an eccentric thereon aligned with the pistons, a bearing ring rotatable on the eccentric and having a plurality of separate outer surfaces engageable respectively by the inner ends of said pistons for driving the latter outwardly through pumping strokes, each of said separate outer surfaces having a predetermined shape and the associated piston end having a complementary end surface engageable therewith, both surfaces extending in a direction transverse to the piston axis of reciprocation, means in fluid communication with the central drive chamber for conducting control fluid thereto, and means connected to the last recited means for varying the pressure in the drive chamber gradually relative to the intake pressure in the pump chambers between a minimum value enabling the maximum piston intake stroke permitted by said eccentric and ring and a greater maximum pressure reducing the piston intake stroke to a minimum value no less than that at which at least one piston engages the ring at all times to prevent its rotation.

33. In a fluid translating apparatus having pump means, an outlet for conducting the pump output to a load device, and means for varying pump displacement including a control fluid chamber for receiving fluid under pressure to decrease pump displacement, means for compensating for sudden pressure decreases in the outlet, comprising, a conduit connectable to said control fluid chamber and to drain, a valve in said conduit including a valve member movable between a closed position blocking flow through the conduit and an open position permitting flow through the conduit, a spring urging the valve member toward closed position, a first passage connectable with the pump outlet and leading to one end of the valve member so that outlet pressure acts in conjunction with said spring to urge the valve member toward closed position, a second passage connecting the pump outlet to the opposite end of the valve member, a restrictive orifice in the second passage, and an accumulator connected with the second passage between the orifice and the valve.

34. A fluid translating apparatus, comprising, a cylinder block having a plurality of radially arranged cylinders therein having inner ends opening into a central drive chamber and outer ends providing pump chambers, a plurality of pump pistons reciprocable respectively in the chambers and having inner ends projectable into the central chamber, valve means for admitting and exhausting fluid to and from the pump chambers, a pump outlet communicating with the exhaust valve means, means urging the pistons inwardly through intake strokes, a drive shaft in said central chamber having an eccentric thereon engageable by the inner ends of the pistons for driving the latter outwardly through pumping strokes, and means for varying the piston strokes infinitely between maximum and minimum lengths to maintain a constant outlet pressure, including, a conduit leading from said outlet, a valve in said conduit including a movable valve member and means normally biasing the valve member to a closed position blocking flow through said conduit, a passage connecting the outlet and the valve for movement of the valve member by fluid in the outlet to open positions proportional to outlet pressure, means in said conduit downstream from said valve for maintaining a back pressure, and a second conduit connected to said drive chamber and to the first conduit between said valve and said back pressure maintaining means for conducting pressure fluid to said drive chamber to vary the pressure therein and thereby vary the piston strokes.

35. A fluid translating apparatus as defined in claim 34, including a drain valve communicating with said drive chamber, passage means communicating with the pump outlet and the drain valve to supply pump outlet pressure to the drain valve to maintain the latter in a closed position blocking drain of fluid from the drive chamber, and means for moving the drain valve to an open position on pressure decrease in the pump outlet thereby to drain fluid from the drive chamber.

References Cited in the file of this patent

UNITED STATES PATENTS

| | | |
|---|---|---|
| 1,881,939 | Purdy | Oct. 11, 1932 |
| 2,018,111 | Babitch | Oct. 22, 1935 |
| 2,064,750 | Hurst | Dec. 15, 1936 |
| 2,094,171 | Hoffer | Sept. 28, 1937 |
| 2,324,291 | Dodge | July 13, 1943 |
| 2,345,125 | Huber | Mar. 28, 1944 |
| 2,427,253 | Browne | Sept. 9, 1947 |
| 2,472,802 | Bentley | June 14, 1949 |
| 2,540,328 | Gray | Feb. 6, 1951 |
| 2,650,543 | Pauget | Sept. 1, 1953 |
| 2,666,393 | Troeger et al. | Jan. 19, 1954 |
| 2,683,423 | Raymond | July 13 1954 |
| 2,786,424 | Raymond | Mar. 26, 1957 |
| 2,843,141 | Arnot et al. | July 15, 1958 |
| 2,861,585 | Becker | Nov. 25, 1958 |